(12) United States Patent
Xu et al.

(10) Patent No.: US 12,555,295 B2
(45) Date of Patent: Feb. 17, 2026

(54) IMAGE PROCESSING METHOD FOR A VIRTUAL SUBJECT, ELECTRONIC DEVICE, AND STORAGE MEDIUM

(71) Applicant: Beijing Zitiao Network Technology Co., Ltd., Beijing (CN)

(72) Inventors: Liyou Xu, Beijing (CN); Siyuan Wang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 121 days.

(21) Appl. No.: 18/027,865

(22) PCT Filed: Nov. 3, 2022

(86) PCT No.: PCT/CN2022/129460
§ 371 (c)(1),
(2) Date: Mar. 22, 2023

(87) PCT Pub. No.: WO2024/011792
PCT Pub. Date: Jan. 18, 2024

(65) Prior Publication Data
US 2024/0378784 A1    Nov. 14, 2024

(30) Foreign Application Priority Data
Jul. 15, 2022  (CN) .......................... 202210837536.3

(51) Int. Cl.
*G06T 13/40* (2011.01)
*G06T 7/50* (2017.01)
(Continued)

(52) U.S. Cl.
CPC ................ *G06T 13/40* (2013.01); *G06T 7/50* (2017.01); *G06T 7/60* (2013.01); *G06T 19/00* (2013.01);
(Continued)

(58) Field of Classification Search
CPC ....................................................... G06T 13/40
See application file for complete search history.

(56) References Cited

U.S. PATENT DOCUMENTS

2002/0196258 A1* 12/2002 Lake ...................... G06T 13/40
345/474
2014/0334670 A1   11/2014 Guigues et al.
(Continued)

FOREIGN PATENT DOCUMENTS

CN        105976418 A       9/2016
CN        108133505 A       6/2018
(Continued)

OTHER PUBLICATIONS

International Search Report and Written Opinion in PCT/CN2022/129460, mailed Apr. 10, 2023, 9 pages.
(Continued)

*Primary Examiner* — Shivang I Patel
(74) *Attorney, Agent, or Firm* — Astute IP Law Group

(57) ABSTRACT

Provided are an image processing method and apparatus, an electronic device, and a storage medium. The method includes dividing a target virtual subject in a to-be-processed video frame into multiple skeleton chains, where each of the multiple skeleton chains includes at least one skeleton point; determining collision information between at least one skeleton point in the multiple skeleton chains and a colliding body and determining target display information of the at least one skeleton point in the to-be-processed video frame according to the collision information; and controlling the target virtual subject to be displayed in the to-be-processed video frame according to the target display information of the at least one skeleton point.

19 Claims, 8 Drawing Sheets

(51) Int. Cl.
*G06T 7/60* (2017.01)
*G06T 19/00* (2011.01)

(52) U.S. Cl.
CPC .............. *G06T 2207/20044* (2013.01); *G06T 2210/21* (2013.01)

(56) References Cited

U.S. PATENT DOCUMENTS

2019/0070505 A1* 3/2019 Ratelle .................... A63F 13/57
2021/0390750 A1 12/2021 Ohashi

FOREIGN PATENT DOCUMENTS

| | | | |
|---|---|---|---|
| CN | 108984087 A | 12/2018 | |
| CN | 111589125 A | 8/2020 | |
| CN | 112001989 A | 11/2020 | |
| CN | 112562072 A | 3/2021 | |
| CN | 114602177 A | 6/2022 | |
| CN | 114742952 A | 7/2022 | |
| CN | 115131478 A | 9/2022 | |
| WO | 2022021686 A1 | 2/2022 | |

OTHER PUBLICATIONS

Extended European Search Report received for European Patent Application No. 22868422.1, mailed on Apr. 24, 2024, 4 pages.
Office Action for Chinese Patent Application No. 202210837536.3, mailed on Feb. 24, 2025, 15 pages.

* cited by examiner

IMAGE PROCESSING METHOD FOR A VIRTUAL SUBJECT, ELECTRONIC DEVICE, AND STORAGE MEDIUM

This application is a National Stage Application filed under 35 U.S.C. 371 based on International Patent Application No. PCT/CN2022/129460, filed on Nov. 3, 2022, which claims priority to Chinese Patent Application No. 202210837536.3 filed with the China National Intellectual Property Administration (CNIPA) on Jul. 15, 2022, the disclosures of which are incorporated herein by reference in their entirety.

TECHNICAL FIELD

Embodiments of the present disclosure relate to the field of image processing technology, for example, an image processing method and apparatus, an electronic device, and a storage medium.

BACKGROUND

With the rapid development of virtual reality (VR) technology, experiencing a virtual world by wearing a VR device becomes a common way of entertainment of a user.

In some virtual scenes, a collision between virtual subjects, between virtual objects, or between a subject and an object may result in mutual penetration and superimposition. In particular, when a virtual subject makes a body movement, a collision between limbs may occur, causing an occlusion between the limbs or model "clipping through" and thus causing a low verisimilitude of screen display.

SUMMARY

The present disclosure provides an image processing method and apparatus, an electronic device, and a storage medium so that when a skeleton point of a virtual subject collides with a colliding body in a display interface, the display position of the skeleton point in the display interface can be adjusted and so that the verisimilitude of display screen can be improved.

In a first aspect, an embodiment of the present disclosure provides an image processing method.

The method includes dividing a target virtual subject in a to-be-processed video frame into multiple skeleton chains, where each of the multiple skeleton chains includes at least one skeleton point: determining collision information between at least one skeleton point in the multiple skeleton chains and a colliding body and determining target display information of the at least one skeleton point in the to-be-processed video frame according to the collision information; and controlling the target virtual subject to be displayed in the to-be-processed video frame according to the target display information of the at least one skeleton point.

In a second aspect, an embodiment of the present disclosure provides an image processing apparatus. The apparatus includes a skeleton chain division module, a collision information determination module, and a target virtual subject display module.

The skeleton chain division module is configured to divide a target virtual subject in a to-be-processed video frame into a plurality of skeleton chains, where each of the plurality of skeleton chains includes at least one skeleton point.

The collision information determination module is configured to determine collision information between the at least one skeleton point in the plurality of skeleton chains and a colliding body and determine target display information of the at least one skeleton point in the to-be-processed video frame according to the collision information.

The target virtual subject display module is configured to control the target virtual subject to be displayed in the to-be-processed video frame according to the target display information of the at least one skeleton point.

In a third aspect, an embodiment of the present disclosure provides an electronic device. The electronic device includes one or more processors; and a storage apparatus configured to store one or more programs.

The one or more processors are configured to perform the image processing method of any embodiment of the present disclosure when executing the one or more programs.

In a fourth aspect, an embodiment of the present disclosure provides a storage medium having computer-executable instructions which, when executed by a computer processor, cause the processor to perform the image processing method of any embodiment of the present disclosure.

BRIEF DESCRIPTION OF DRAWINGS

The same or similar reference numerals throughout the drawings denote the same or similar elements. It is to be understood that the drawings are illustrative and that originals and elements are not necessarily drawn to scale.

DETAILED DESCRIPTION

Figure 1:
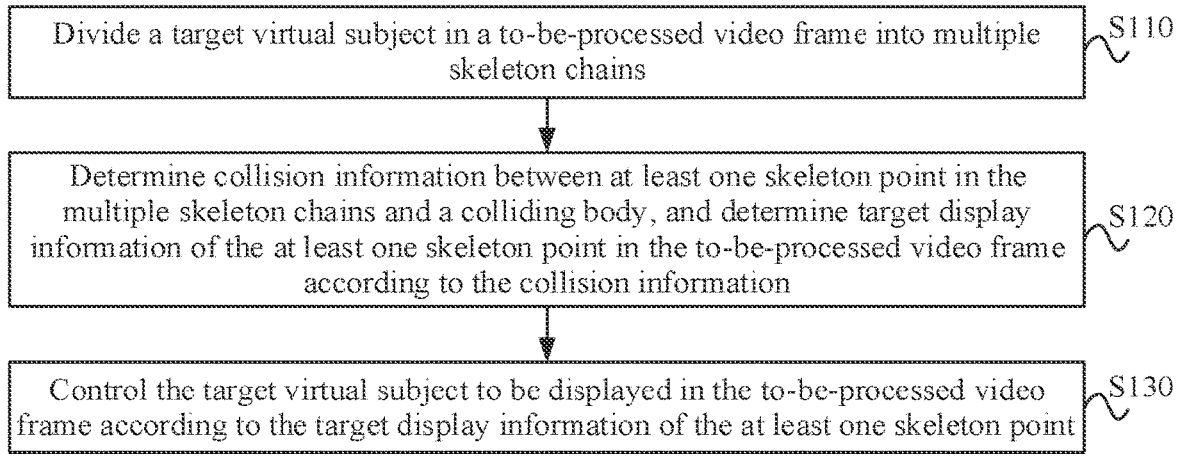
FIG. 1 is a flowchart of an image processing method according to an embodiment of the present disclosure.

It is to be understood that steps described in method embodiments of the present disclosure may be performed in different orders and/or in parallel. Additionally, the method embodiments may include additional steps and/or omit the steps shown. The scope of the present disclosure is not limited in this respect.

The term "includes" or its variant used herein means "includes, but is not limited to". The term "based on" used herein means "at least partially based on". The term "an embodiment" used herein means "at least one embodiment". The term "another embodiment" used herein means "at least another embodiment". The term "some embodiments" used herein means "at least some embodiments". Related definitions of other terms are given in the description hereinafter.

It is to be noted that concepts such as "first" and "second" used herein are intended to distinguish between apparatuses, modules or units and not to limit the order of or dependency between functions performed by the apparatuses, modules or units. It is to be noted that "one" or "multiple" in the present disclosure is illustrative and non-limiting and that those skilled in the art should understand that "one" or "multiple" is interpreted as "one or more" unless otherwise specified in the context.

The names of messages or information exchanged between apparatuses in embodiments of the present disclosure are illustrative and not to limit the scope of the messages or information.

It is to be understood that the type, use range, and use scenarios of personal information involved in the present disclosure should be notified to and authorized by a user appropriately according to relevant laws and regulations before solutions of embodiments of the present disclosure are used.

For example, in response to receiving an active request from a user, prompt information is sent to the user to explicitly remind the user that the requested operation requires acquisition and use of personal information of the user. Accordingly, the user can autonomously choose, according to the prompt information, whether to provide personal information for software or hardware, such as an electronic device, an application program, a server, or a storage medium, for executing operations of solutions of the present disclosure.

In an illustrative and non-limiting embodiment, in response to receiving the active request from the user, the manner in which the prompt information is sent to the user may be, for example, in the form of a pop-up window in which the prompt information may be presented in text. Additionally, the pop-up window may also carry a selection control for the user to select "agree" or "disagree" to determine whether to provide personal information for the electronic device.

It is to be understood that the preceding process of notifying the user and getting authorization from the user is illustrative and does not limit embodiments of the present disclosure and that other manners complying with relevant laws and regulations may also be applied to embodiments of the present disclosure.

It is to be understood that data (including, but not limited to, the data itself and acquisition or use of the data) involved in the solutions should comply with corresponding laws and regulations and relevant provisions.

Before the technical solutions are introduced, application scenes of embodiments of the present disclosure may be exemplified. Solutions of the present disclosure may be applied to the scenario where a body animation exists in a display interface. This scenario may be, for example, animation retargeting or artificial intelligence body recognition. The body animation may be triggered by a button displayed in the display interface or may be triggered by a preset continuous motion process of a target part of a target subject. For example, in a game, a user clicks a button or touches the screen to control a target character release skill in the display interface to make a target part of a target character move to display a special skill effect. At this time, a body animation may be displayed in the display interface by using solutions of the present disclosure to achieve the effect of skeleton retargeting. That is, the solution of this embodiment of the present disclosure can be used to adjust the display position of a skeleton point of a limb in the display interface as along as the skeleton point of the limb collides with the colliding body to which another limb belongs when the target virtual subject in the display interface is moving. In this manner, "clipping through" or occlusion is prevented during display.

The apparatus for performing the image processing method of any embodiment of the present disclosure may be integrated in application software having the image processing function. This software may be installed in an electronic device such as a mobile terminal or a PC terminal. This application software may be image or video processing software. Examples of this software are not enumerated here as long as this software can implement image or video processing.

FIG. 1 is a flowchart of an image processing method according to an embodiment of the present disclosure. This embodiment of the present disclosure is applicable to the scenario where collision information between multiple skeleton points in a target virtual subject and a colliding body is acquired in real time or periodically, and then the display positions of the corresponding skeleton points in a display interface are adjusted according to the collision information. The method may be performed by an image processing apparatus. The apparatus may be implemented in software and/or hardware, for example, an electronic device. The electronic device may be, for example, a mobile terminal, a PC terminal, or a server.

As shown in FIG. 1, the method includes the steps below:

In S110, a target virtual subject in a to-be-processed video frame is divided into multiple skeleton chains.

It is to be noted that a video generated or collected in advance may be processed. In this case, in a video play process, each video frame may be used as a to-be-processed video frame. Alternatively, a video is generated in real time. For example, when an external game is connected, to avoid "clipping through" while a game frame is being played, a video frame collected or played in real time may be used as a to-be-processed video frame. A to-be-processed video frame may contain a target virtual subject or may not contain a target virtual subject. When a to-be-processed video frame contains a target virtual subject, the solution of this embodiment of the present disclosure may be used to determine whether a skeleton point of the target virtual subject collides with a colliding body. If no collision occurs, the skeleton point is directly displayed. If a collision occurs, the solution of this embodiment of the present disclosure may be used to determine the display position of the skeleton point in a display interface. The target virtual subject may be a three-dimensional subject constructed in a virtual scene. The target virtual subject may be, for example, a virtual human or a virtual animal.

A skeleton chain may be a skeleton model that constitutes the target virtual subject. The skeleton chain may include at least one skeleton point. Skeleton points in the skeleton chain correspond to different articular points in the skeleton chain. Illustratively, when the skeleton chain is an arm skeleton chain, a skeleton point in the skeleton chain may be a shoulder skeleton point, an upper arm skeleton point, an elbow skeleton point, a lower arm skeleton point, or a wrist skeleton point.

In practical application, a target virtual subject is composed of at least one part, for example, a shoulder, a hand, or a leg: therefore, the target virtual subject may be divided into multiple skeleton chains according to the at least one part.

By way of example, dividing the target virtual subject in the to-be-processed video frame into the multiple skeleton chains includes dividing the target virtual subject into multiple detection parts according to a preset part division rule; and determining the multiple skeleton chains corresponding to the multiple detection parts.

The part division rule is the basis on which the target virtual subject is divided into multiple skeleton chains. A detection part may be any part in the target virtual subject. Illustratively, a detection part may be a face, a shoulder, a hand, or a leg.

In this embodiment, the entire skeleton of the target virtual subject is a tree structure that may be divided into 5 skeleton chains: a trunk skeleton chain, two arm skeleton chains, and two leg skeleton chains.

By way of example, a to-be-processed video frame may be acquired, and a target virtual subject in the to-be-processed video frame may be determined. For example, the target virtual subject may be divided into body parts according to a preset body part division standard to obtain at least one detection part, and then a skeleton chain corresponding to each detection part may be determined so that a corresponding analysis may be performed on each detection part. Thus, collision information of each skeleton point in the skeleton chain and the corresponding target display information are determined accurately so that each skeleton point of the target virtual subject is corrected accurately.

In S120, collision information between at least one skeleton point in the multiple skeleton chains and a colliding body is determined, and target display information of the at least one skeleton point in the to-be-processed video frame is determined according to the collision information.

The colliding body may correspond to another component in the to-be-processed video frame or may correspond to the target virtual subject. Illustratively, different parts of the target virtual subject correspond to different colliding bodies. When the target virtual subject is waving, the arm collides with the colliding body corresponding to the trunk of the target virtual subject so that the body part of the target virtual subject is occluded when displayed. In this case, the colliding body corresponds to the trunk of the target virtual subject. The collision information may indicate whether a skeleton point collides with a colliding body. Since a component to which a skeleton point belongs in a virtual scene is also a colliding body, collision information between the skeleton point and a colliding body may be reflected by whether an overlap or "clipping through" occurs between two models. Generally, when a collision detection is performed between skeleton points and colliding bodies and the corresponding collision information is determined, to avoid a collision, it is required to move the display position of a colliding skeleton point in the display interface according to the collision information such that the skeleton point and the corresponding colliding body do not pass through each other. At this time, the skeleton point is displayed, in the to-be-processed video frame, with the current display position information of the skeleton point, and the position information of the skeleton point finally displayed in the display interface is used as the target display information.

For example, when at least one skeleton chain in the target virtual subject collides with a colliding body corresponding to another component in the to-be-processed video frame or collides with a colliding body corresponding to its own body part, it is required to determine the relative position information of the colliding skeleton point and the colliding body so that the target display information of the skeleton point in the to-be-processed video frame can be determined according to the relative position information.

In S130, the target virtual subject is controlled to be displayed in the to-be-processed video frame according to the target display information of the at least one skeleton point.

By way of example, after the target display information of at least one skeleton point is determined, the display position of a skeleton point in the display interface may be adjusted according to the target display information so as to avoid "clipping through" caused by a collision, and thus the display screen effect and verisimilitude are improved.

By way of example, controlling the target virtual subject to be displayed in the to-be-processed video frame according to the target display information of the at least one skeleton point includes rendering the target virtual subject in the to-be-processed video frame according to the adjusted target display position of the at least one skeleton point.

The target display position may be the position information finally displayed in the to-be-processed video frame in the case where multiple skeleton points do not collide with a colliding body.

In an example embodiment, the display position of each skeleton point in the display interface may be adjusted from the initial display position to the target display position according to the target display position of each skeleton point. By way of example, the target virtual subject is rendered in the to-be-processed video frame to display the target virtual subject in the to-be-processed video according to the target display position of the skeleton point in the display interface to improve the display effect and verisimilitude of the target virtual subject in the to-be-processed video frame.

The solution of this embodiment of the present disclosure includes dividing a target virtual subject in a to-be-processed video frame into multiple skeleton chains: determining collision information between the at least one skeleton point in the multiple skeleton chains and a colliding body and determining target display information of the at least one skeleton point in the to-be-processed video frame according to the collision information; and controlling the target virtual subject to be displayed in the to-be-processed video frame according to the target display information of the at least one skeleton point. In this manner, a skeleton point of the target virtual subject is prevented from colliding with a colliding subject. Thereby, mutual penetration and superimposition between the skeleton point and the colliding subject is prevented, and thus a poor animation display effect is prevented. Moreover, the display position of the skeleton point of the target virtual subject in the display interface is automatically adjusted when "clipping through" is detected in the display interface: thereby, the verisimilitude of display screen is improved, the animation display effect is improved, and the user experience is improved.

Figure 2:
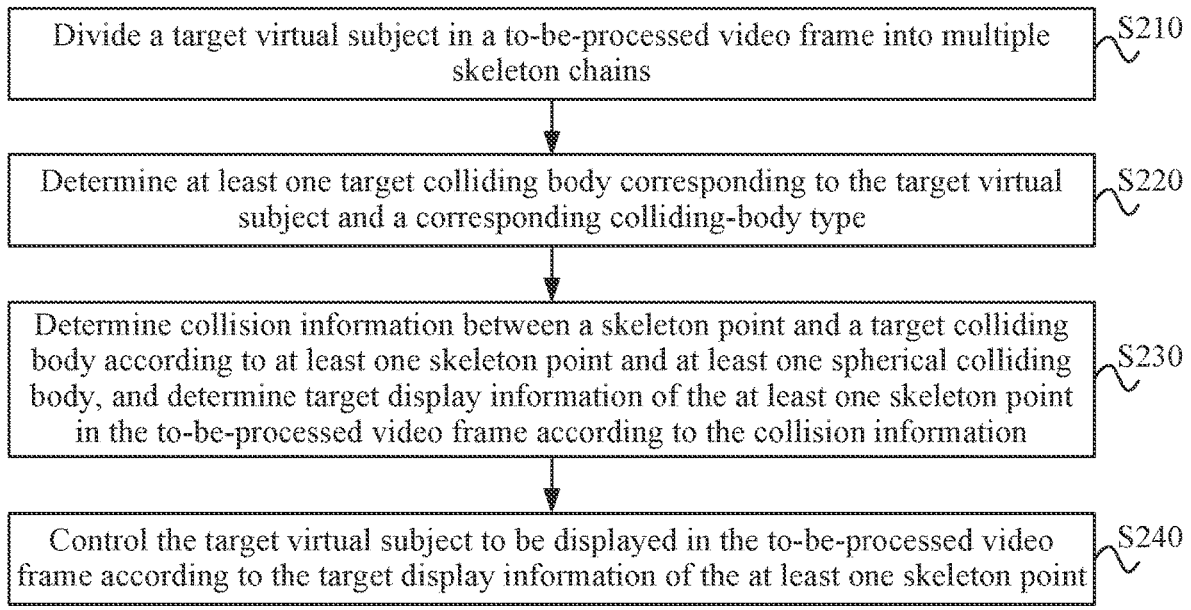
FIG. 2 is a flowchart of an image processing method according to an embodiment of the present disclosure.

FIG. 2 is a flowchart of an image processing method according to an embodiment of the present disclosure. Based on the preceding embodiment, for different types of colliding bodies, the target display information of skeleton points is determined in different manners. This embodiment is described by using a spherical colliding body as an example.

The explanation of a term identical to or corresponding to the previous embodiment is not repeated here.

As shown in FIG. 2, the method includes the steps below.

In S210, a target virtual subject in a to-be-processed video frame is divided into multiple skeleton chains.

In S220, at least one target colliding body corresponding to the target virtual subject and a corresponding colliding-body type are determined.

The target colliding body may be an subject that collides with a target virtual subject in a virtual scene. Illustratively, when a target virtual subject displayed in a to-be-processed video frame collides with a box while striding over the box, the box is a target colliding body: or when a target virtual subject displayed in a to-be-processed video frame passes through a wall in a virtual scene, the wall is a target colliding body. The colliding-body type may be obtained by division according to the display shape of a colliding body in a virtual scene. There may be multiple colliding-body types.

It is to be noted that there may be one or more target colliding bodies. A target virtual subject in the display interface may collide with one or more colliding bodies to which the target virtual subject belongs when a limb of the target virtual subject is moving. Illustratively, when a target virtual subject is waving a hand, the target virtual subject may probably collide with, depending on the amplitude of the waving, a colliding body to which a shoulder skeleton point of the target virtual subject belongs and/or a colliding body to which each trunk skeleton point belongs. In this embodiment of the present disclosure, in the display interface, the display position of a skeleton point colliding with only one target colliding body is adjusted. When multiple target colliding bodies exist, the display position of a skeleton point in the display interface may also be adjusted using the method of this embodiment of the present disclosure.

In an example embodiment, after the target virtual subject is divided into multiple skeleton chains, different colliding bodies in different shapes correspond to different collision information, and a skeleton point is adjusted in different manners after colliding with the different colliding bodies. Therefore, when collision information between each skeleton point and a colliding body is determined, it is required to determine at least one colliding body colliding with a target virtual subject and determine the colliding-body type of each colliding body so that the corresponding collision information can be determined according to each type of colliding body, thereby improving the display effect of the target virtual subject.

In S230, collision information between a skeleton point and at least one target colliding body is determined according to at least one skeleton point and at least one spherical colliding body, and target display information of the at least one skeleton point in the to-be-processed video frame is determined according to the collision information.

It is to be noted that for different types of target colliding bodies, collision information between skeleton points and corresponding target colliding bodies is determined in different manners, and colliding skeleton points are adjusted differently. Therefore, collision information between a skeleton point and a target colliding body may be determined according to the type of the target colliding body.

By way of example, determining collision information between the skeleton point and the at least one target colliding body according to the at least one skeleton point and the colliding-body type includes, for two adjacent skeleton points in the same skeleton chain in a first direction, determining collision information between the two adjacent skeleton points and a target colliding body according to the target colliding body, a first colliding body to which a parent skeleton point belongs, and a second colliding body to which a child skeleton point belongs.

The first direction points from the parent skeleton point to the child skeleton point. The parent skeleton point and the child skeleton point may be two adjacent nodes that are located in the same skeleton chain and that have a parent-child relationship. The parent skeleton point is a skeleton point away from the first direction. The child skeleton point is a skeleton point pointed to by the first direction. In the same skeleton chain, the parent skeleton point and the child skeleton point are relative to each other. Illustratively, an arm skeleton chain includes a shoulder skeleton point, an elbow skeleton point, and a wrist skeleton point in the first direction. For a pair composed of the shoulder skeleton point and the elbow skeleton point, the shoulder skeleton point is a parent skeleton point, and the elbow skeleton point is a child skeleton point. For a pair composed of the elbow skeleton point and the wrist skeleton point, the elbow skeleton point is a parent skeleton point, and the wrist skeleton point is a child skeleton point. The first colliding body to which the parent skeleton point belongs may be a colliding body centered on the parent skeleton point. Accordingly, the second colliding body to which the child skeleton point belongs may be a colliding body centered on the child skeleton point. It is to be noted that the first colliding body and the second colliding body are each a body part in the target virtual subject. When the target virtual subject is a virtual character, the parent skeleton point is a shoulder skeleton point, and the child skeleton point is an upper arm articular skeleton point, then the first colliding body is a shoulder of the target virtual subject, and the second colliding body is an upper arm of the target virtual subject.

In practical use, for a pair composed of a parent skeleton point and a child skeleton point adjacent to each other in the same skeleton chain, collision information between a first colliding body to which the parent skeleton point belongs and a target colliding body is different from collision information between a second colliding body to which the child skeleton point belongs and the target colliding body. Therefore, collision information between the first colliding body and the target colliding body and collision information between the second colliding body and the target colliding body may be determined separately. In this manner, the relative positions between colliding bodies corresponding to different skeleton points and the target colliding body can be determined accurately, and collision information between the skeleton points and the target colliding body can be determined accurately. Thereby, the verisimilitude of display of the target virtual subject in the to-be-processed video frame can be improved.

Figure 3:
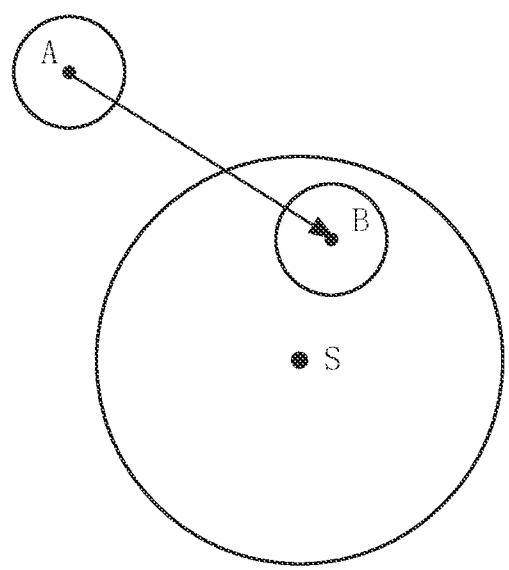
FIG. 3 is a schematic plan view of a spherical colliding subject according to an embodiment of the present disclosure.

Illustratively, as shown in FIG. 3, the sphere to which point S belongs is a target colliding body, point B is a child skeleton point, the sphere centered on point B is a second colliding body, point A is a parent skeleton point, and the sphere centered on point A is a first colliding body.

By way of example, determining collision information between the skeleton point and the target colliding body according to the target colliding body; the first colliding body to which the parent skeleton point belongs, and the second colliding body to which the child skeleton point belongs includes, for the parent skeleton point, determining a first sphere center distance between the first colliding body and the target colliding body and determining collision information between the target colliding body and at least one of the parent skeleton point or the child skeleton point according to the first sphere center distance and a target sphere radius of the target colliding body; and for the child skeleton point, determining a second sphere center distance between the second colliding body and the target colliding body and determining collision information between the child skeleton point and the target colliding body according to the second sphere center distance, the target sphere radius, and a second sphere radius of the second colliding body.

The first sphere center distance may be the linear distance between the parent skeleton point and the node where the sphere center of the target colliding body is located. The target sphere radius may be a line segment connecting the sphere center of the target colliding subject to any point on the sphere surface of the target colliding subject. The second sphere center distance may be the linear distance between the child skeleton point and the node where the sphere center of the target colliding body is located. The second sphere radius may be a line segment connecting the child skeleton point to any point on the surface of the second colliding subject.

In practical use, when determining collision information between the parent skeleton point and the target colliding body and collision information between the child skeleton point and the target colliding body, it is feasible to determine the relative distance between the first colliding body to which the parent skeleton point belongs and the target colliding body, compare the relative distance with the radius of the target colliding body, and determine collision information between the target colliding body and the parent skeleton point and/or the child skeleton point according to the comparison result. For a pair composed of a parent skeleton point and a child skeleton point adjacent to each other in a skeleton chain, different collision information is determined according to corresponding relative position information. In this manner, the accuracy of the collision information can be improved, and thereby the verisimilitude of display of the target virtual subject in the to-be-processed video frame can be improved.

Illustratively, as shown in FIG. 3, the first sphere center distance |SA| is the distance between point S and point A, and the second sphere center distance |SB| is the distance between point S and point B.

By way of example, determining collision information between the target colliding body and the parent skeleton point and/or the child skeleton point according to the first sphere center distance and the target sphere radius of the target colliding body includes, in response to determining that the first sphere center distance is less than the target sphere radius, determining that collision information of the parent skeleton point is first collision information; and in response to determining that the first sphere center distance is greater than the target sphere radius, determining that collision information of the child skeleton point is second collision information.

The first collision information is that the parent skeleton point is inside the target colliding body. The second collision information is that the child skeleton point is inside the target colliding body.

In an example embodiment, to determine collision information between the skeleton point and the target colliding body more accurately and quickly, after determining the first sphere center distance between the first colliding body and the target colliding body, the first sphere center distance is compared with the target sphere radius to determine collision information between the parent skeleton point and the target colliding body and collision information between the child skeleton point and the target colliding body. When the first sphere center distance is less than the target sphere radius, the parent skeleton point is inside the target colliding body, and the corresponding collision information is the first collision information. When the first sphere center distance is greater than the target sphere radius, at least one skeleton point in the current skeleton chain collides with the target colliding body, and the parent skeleton point and the child skeleton point adjacent to each other in the same skeleton chain are connected to each other: therefore, when the distance between the parent skeleton point and the sphere center of the target colliding body is greater than the target sphere radius, the child skeleton point adjacent to the parent skeleton point is inside the target colliding body, and the corresponding collision information is the second collision information.

Illustratively, as shown in FIG. 3, the radius of the colliding body S is Sr, and the radius of colliding body A and the radius of colliding body B are both Br. If |SA|<Sr, point A is inside the colliding body S. If |SA|>Sr, point B is inside the colliding body S.

By way of example, determining collision information between the child skeleton point and the target colliding body according to the second sphere center distance, the target sphere radius, and the second sphere radius of the second colliding body includes determining a first sum radius according to the target sphere radius and the second sphere radius: in response to determining that the second sphere center distance is greater than the first sum radius, determining that the collision information is third collision information; and in response to determining that the second sphere center distance is less than the first sum radius, determining that the collision information is second collision information.

The first sum radius may be the distance obtained from the sum of the target sphere radius and the second sphere radius. The third collision information is that the child skeleton point is not in collision with the target colliding body: The second collision information is that the child skeleton point is inside the target colliding body.

By way of example, to determine collision information between the child skeleton point and the target colliding body more accurately and quickly, it is feasible to add up the target sphere radius and the second sphere radius of the second colliding body to which the child skeleton point belongs to obtain the first sum radius. By way of example, the first sum radius is compared with the second sphere center distance, and collision information between the child skeleton point and the target colliding body is determined according to the comparison result. When the second sphere center distance is greater than the first sum radius, the second colliding body to which the child skeleton point belongs is not in contact with and thus not in collision with the target colliding body. Therefore, collision information between the child skeleton point and the target colliding body is the third collision information, that is, the child skeleton point is not in collision with the target colliding body. When the second sphere center distance is less than the first sum radius, the second colliding body to which the child skeleton point belongs is in contact with and overlaps the target colliding body. Therefore, collision information between the child skeleton point and the target colliding body is the second collision information, that is, the child skeleton point is inside the target colliding body.

Illustratively, as shown in FIG. 3, if |BS|>Sr+Br, point B is not in collision with colliding body S, so the skeleton point does not require to be processed and may be displayed with the corresponding initial position information. If |BS|<Sr+Br, point B is inside colliding body S.

By way of example, collision information is different between multiple skeleton points and the target colliding body, so the target display information of the multiple skeleton points in the to-be-processed video frame may be determined according to different collision information.

By way of example, determining the target display information of the at least one skeleton point in the to-be-processed video frame according to the collision information includes, in response to determining that the collision information is the first collision information, adjusting the target display position of the parent skeleton point in the to-be-processed video frame according to target sphere center coordinates of the target colliding body, first sphere center coordinates of the first colliding body, second sphere center coordinates of the second colliding body, and a first sum radius.

In practical use, a spatial coordinate system may be constructed in a three-dimensional space according to the target colliding body, the first colliding body, and the second colliding body. Sphere center position coordinates of the target colliding body are the target sphere center coordinates. Sphere center position coordinates of the first colliding body are the first sphere center coordinates. Sphere center position coordinates of the second colliding body are the second sphere center coordinates. The parent skeleton point corresponds to the first sphere center coordinates. The child skeleton point corresponds to the second sphere center coordinates. The target display information includes the target display position.

By way of example, when the collision information is the first collision information, that is, when the parent skeleton point is inside the target colliding body, to adjust the display position of the parent skeleton point in the to-be-processed video frame, a first vector between the two sphere centers may be first determined according to the first sphere center radius and the second sphere center radius because the direction between the parent skeleton point and the child skeleton point adjacent to each other in the same skeleton chain to constitute a pair points from the parent skeleton point to the child skeleton point, where the direction of the vector points from the parent skeleton point to the child skeleton point. Then the first vector is divided by the corresponding modulus length so that a unit vector whose modulus length is 1 and whose vector direction is the same as the vector direction of the first vector is obtained. For example, the scalar product of the unit vector and the first sum radius is determined so that an intermediate value whose modulus length is the length of the line segment corresponding to the first sum radius and whose direction is the vector direction of the first vector is obtained; and the target sphere center coordinates and the intermediate value are added up so that the updated target display position of the parent skeleton point in the to-be-processed video frame is determined. In this manner, the target display position of the parent skeleton point in the to-be-processed video frame can be determined accurately according to the corresponding collision information so that the parent skeleton point can be quickly adjusted to the target display position, thereby improving the animation display effect.

Illustratively, the target display position of the parent skeleton point in the to-be-processed video frame may be determined using the formula below.

$$A' = S + \text{Normalize}(AB) * (Sr + Br)$$

A' denotes updated target display position coordinates of the parent skeleton point. S denotes the target sphere center coordinates. A denotes the first sphere center coordinates. B denotes the second sphere center coordinates. Sr+Br denotes the first sum radius. * denotes scalar product processing.

By way of example, determining the target display information of the at least one skeleton point in the to-be-processed video frame according to the collision information includes, in response to determining that the collision information is the second collision information, determining target display information of the child skeleton point in the to-be-processed video frame according to the first sum radius, the first sphere center distance, first sphere center coordinates of the parent skeleton point, and second sphere center coordinates of the child skeleton point.

By way of example, when the collision information is the second collision information, that is, when the child skeleton point is inside the target colliding body, related position information of the parent skeleton point, related position information of the child skeleton point, and position information between the parent skeleton point and the target colliding body are required to determine the updated target display position of the child skeleton point in the to-be-processed video frame. In this manner, the target display position of the child skeleton point in the to-be-processed video frame can be determined accurately according to the corresponding collision information so that the child skeleton point can be quickly adjusted to the target display position, thereby improving the animation display effect.

By way of example, determining the target display information of the child skeleton point in the to-be-processed video frame according to the first sum radius, the first sphere center distance, the first sphere center coordinates of the parent skeleton point, and the second sphere center coordinates of the child skeleton point includes determining a first transition value according to the first sphere center distance, the first sum radius, and a third sphere center distance between the first sphere center coordinates and the second sphere center coordinates; determining a first unit vector according to the first sphere center coordinates and target sphere center coordinates; determining a second transition value according to the first transition value, the first sphere center coordinates, and the first unit vector; and determining the target display information according to the second transition value, the first unit vector, and the second sphere center coordinates.

The third sphere center distance may be the distance between the parent skeleton point and the child skeleton point.

Figure 4:
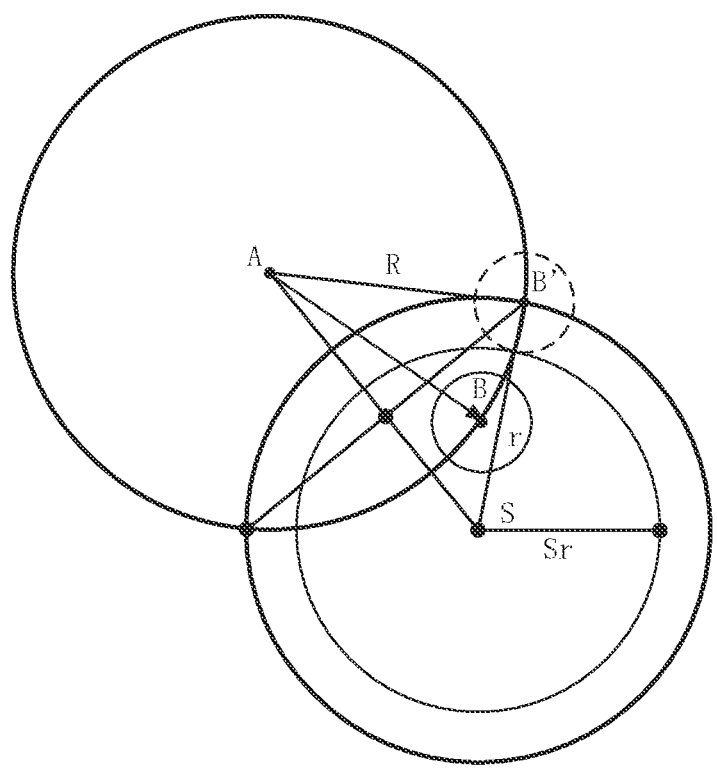
FIG. 4 is a schematic plan view of a spherical colliding subject according to an embodiment of the present disclosure.
Figure 5:
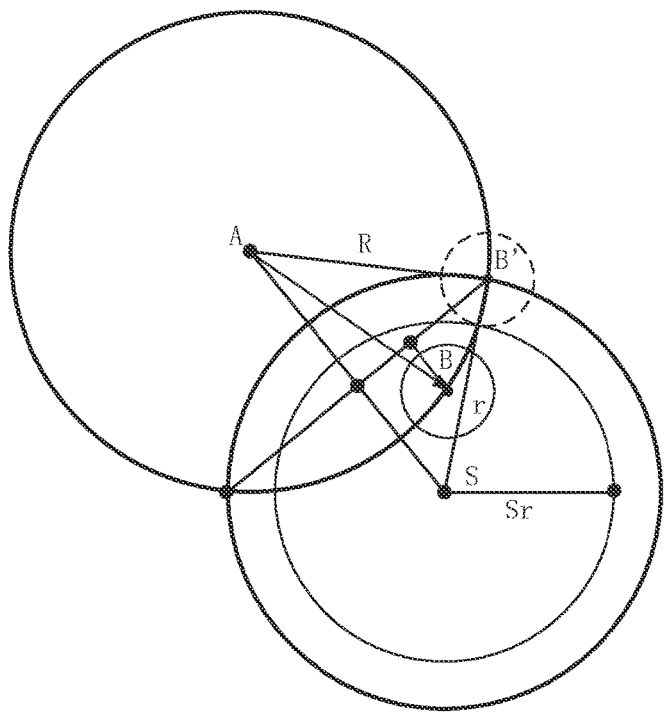
FIG. 5 is a schematic plan view of a spherical colliding subject according to an embodiment of the present disclosure.

Illustratively, as shown in FIGS. 4 and 5, a corresponding auxiliary circle may be constructed for calculating the target display position of the child skeleton point in the to-be-processed video frame.

In practical use, to determine the target display information of the child skeleton point more accurately, it is feasible to square the first sphere center distance, the first sum radius, and the third sphere center distance separately to obtain a first distance value, a second distance value, and a third distance value separately. Then subtraction is performed on the first distance value and the second distance value, the subtraction result is added to the third distance value, and the addition result is divided by twice the first sphere center distance to obtain a distance value that may be used as the first transition value.

By way of example, subtraction is performed on the target sphere center coordinates and the first sphere center coordinates to determine a vector between the two sphere center coordinate points. Then the unit vector of the vector is determined to be the first unit vector. Then the scalar product of the first unit vector and the vector corresponding to the first transition value is determined to obtain coordinates, and the coordinates are added to the first sphere center coordinates to determine the second transition value. Finally, the target display information of the child skeleton point is determined according to the second transition value, the first unit vector, and the second sphere center coordinates.

By way of example, determining the target display information according to the second transition value, the first unit vector, and the second sphere center coordinates includes determining a third transition value according to the first sphere center distance, the third sphere center distance, and the first sum radius: determining a fourth transition value according to the third transition value, the second sphere center coordinates, the first unit vector, and a second unit vector obtained from the second transition value and the second sphere center coordinates; and determining the target display information of the child skeleton point according to the fourth transition value, the second transition value, and the third transition value.

By way of example, to determine the target display information of the child skeleton point more accurately, it is feasible to square the first sphere center distance, the first sum radius, and the third sphere center distance separately to obtain a first distance value, a second distance value, and a third distance value separately. Then subtraction is performed on the first distance value and the second distance value, the subtraction result is added to the third distance value, and the addition result is squared to obtain a first to-be-processed value. Meanwhile, multiplication is performed on the first distance value and the third distance value, and the multiplication result is multiplied by four to obtain a second to-be-processed value. By way of example, subtraction is performed on the second to-be-processed value and the first to-be-processed value, extraction of square root is performed on the subtraction result to obtain a third to-be-processed value, and division is performed on the third to-be-processed value and twice the first sphere radius to obtain the third transition value.

By way of example, the second transition value is obtained from the addition result of coordinates and thus is in the form of coordinates. Subtraction is performed on the second sphere center coordinates and coordinates of the second transition value to obtain the second unit vector. The scalar production of the first unit vector and the second unit vector is calculated, multiplication is performed on the scalar production and the first unit vector to obtain a to-be-processed vector, and subtraction is performed on the second sphere center coordinates and the vector to obtain the fourth transition value.

Finally, the fourth transition value is obtained from the subtraction result of coordinates and thus is indicated in the form of coordinates. Subtraction is performed on coordinates of the fourth transition value and coordinates of the second transition value, the unit vector corresponding to the subtraction result is determined, and the scalar production of the unit vector and the vector corresponding to the third transition value is calculated. The multiplication result is added to the second transition value to obtain the updated target display position of the child skeleton point.

In S240, the target virtual subject is controlled to be displayed in the to-be-processed video frame according to the target display information of the at least one skeleton point.

The solution of this embodiment of the present disclosure includes dividing a target virtual subject in a to-be-processed video frame into multiple skeleton chains: determining at least one target colliding body corresponding to the target virtual subject and a corresponding colliding-body type: determining collision information between a skeleton point and at least one target colliding body according to at least one skeleton point and at least one spherical colliding body; and determining target display information of the at least one skeleton point in the to-be-processed video frame according to the collision information; and controlling the target virtual subject to be displayed in the to-be-processed video frame according to the target display information of the at least one skeleton point. In this manner, a poor animation display effect caused by "clipping through" or occlusion between colliding bodies is prevented during display when a skeleton point collides with a spherical colliding body. Thereby, collision information between the skeleton point and the spherical colliding body and the target display information of the skeleton point in the display interface can be determined accurately and quickly, the display position of the skeleton point in the display interface can be adjusted according to the target display information, and thus the animation display effect can be improved.

Figure 6:
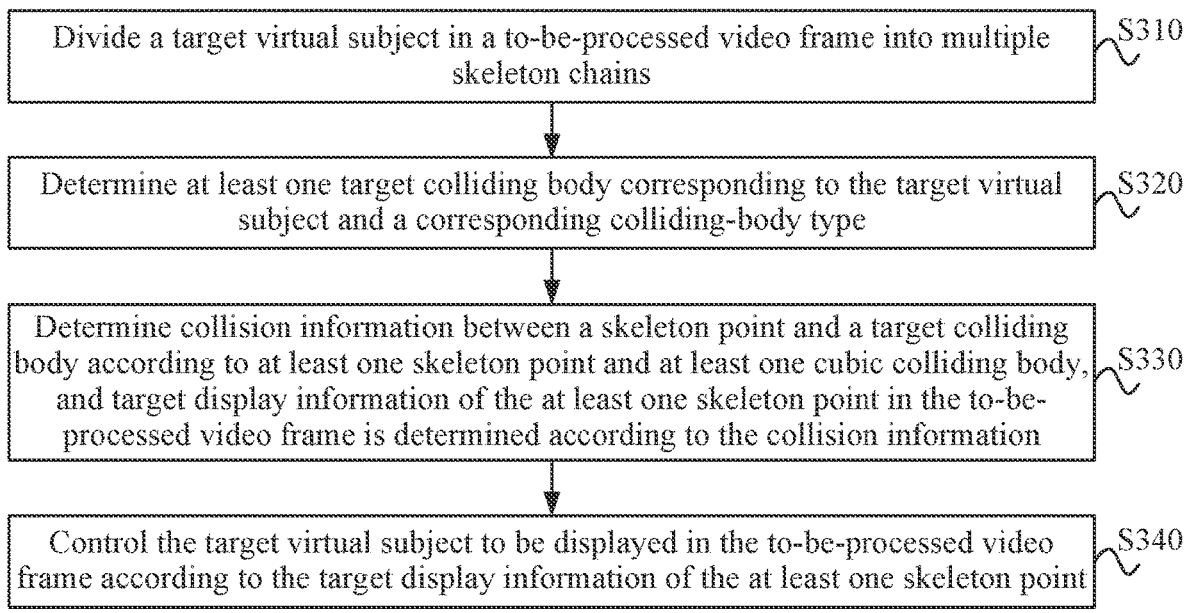
FIG. 6 is a flowchart of an image processing method according to an embodiment of the present disclosure.

FIG. 6 is a flowchart of an image processing method according to an embodiment of the present disclosure. Based on the preceding embodiments, for different types of colliding bodies, the target display information of a skeleton point is determined in different manners. This embodiment is described by using a cubic colliding body as an example. For the example implementation manner, see the detailed description of this solution. The explanation of a term identical to or corresponding to the previous embodiment is not repeated here.

As shown in FIG. 6, the method includes the steps below:

In S310, a target virtual subject in a to-be-processed video frame is divided into multiple skeleton chains.

In S320, at least one target colliding body corresponding to the target virtual subject and a corresponding colliding-body type are determined.

In S330, collision information between a skeleton point and at least one target colliding body is determined according to at least one skeleton point and at least one cubic colliding body, and target display information of the at least one skeleton point in the to-be-processed video frame is determined according to the collision information.

In practical use, when the colliding-body type is a cuboid colliding body, collision information between the skeleton point and the colliding body is determined differently from when the colliding-body type is a spherical colliding body, and the target display information of the skeleton point is determined differently from when the colliding-body type is a spherical colliding body.

By way of example, determining collision information between the at least one skeleton point and the at least one target colliding body according to the at least one skeleton point and the colliding-body type includes, for a skeleton point in the same skeleton chain in a first direction, determining collision information between the skeleton point in the first direction and a target colliding body of the at least one target colliding body according to child coordinates of the skeleton point and a preset function.

The first direction may point from a parent skeleton point to a child skeleton point in the same skeleton chain. The child coordinates may be coordinate information corresponding to a child skeleton point in the same skeleton chain. The preset function may be preset for determining collision information between a skeleton point and a target colliding body. Illustratively, the preset function may be an Abs function for calculating the absolute value of an integer.

In practical use, when the target colliding body is a cubic colliding body, for a skeleton point in the same skeleton chain in a direction pointing from a parent skeleton point to a child skeleton point, the child coordinates of the skeleton point may be substituted into the preset function so that collision information between the skeleton point and the target colliding body is determined. In this manner, collision information can be determined according to the colliding-body type so that collision condition between the skeleton point and the target colliding body can be determined more accurately and quickly and so that the corresponding solution can be determined.

For example, determining collision information between the skeleton point and the target colliding body according to child coordinates of the skeleton point and the preset function includes determining depth values of the skeleton point in multiple dimensions according to the child coordinates and the preset function; and in response to determining that the maximum depth value of the depth values is less than a preset value, determining that collision information between the skeleton point in the first direction and the target colliding body is fourth collision information.

Generally, the target colliding body is a cuboid colliding body, that is, a three-dimensional colliding body. The dimensions of the three-dimensional colliding body are length, width, and height. Thus, the depth values of the skeleton point in multiple dimensions include a depth value in length, a depth value in width, and a depth value in height. It is to be noted that in a spatial coordinate system, a dimension may be indicated by a coordinate axis, that is, an X-axis may denote length, a Y-axis may denote width, and a Z-axis may denote height. The depth value may be a vertical distance between the position of the skeleton point in the target colliding body and the surface of the target colliding body. In practical use, the depth values of the skeleton point in multiple dimensions are compared, and the maximum of these depth values is used as the maximum depth value. The preset value may be a preset standard for determining the type to which the collision information of the skeleton point and the target colliding body belongs. Illustratively, the preset value may be 0. When the maximum depth value is less than the preset value, the skeleton point intersects the target colliding body, that is, the fourth collision information is that the skeleton point intersects the target colliding body.

Figure 7:
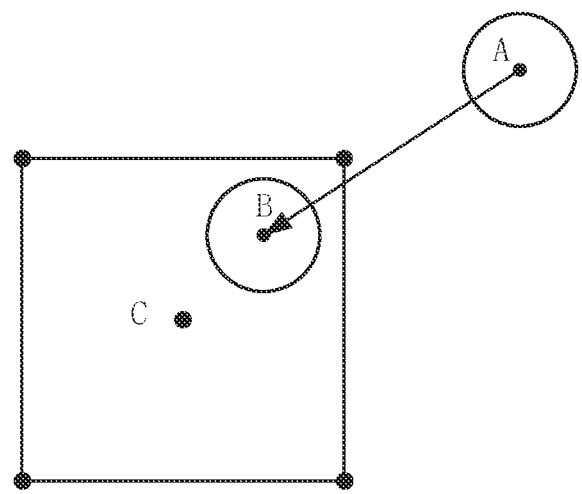
FIG. 7 is a schematic plan view of a cubic colliding subject according to an embodiment of the present disclosure.

Illustratively, as shown in FIG. 7, assuming that the length of the target colliding body in the X-axis, the length of the target colliding body in the Y-axis, and the length of the target colliding body in the Z-axis are Kx, Ky, and Kz respectively, the radius of the colliding body to which the skeleton point belongs is Br, and the center coordinate point C of the target colliding body is (0, 0, 0), then the depth values of the skeleton point in multiple dimensions may be determined using the formulas below.

$$DepthX = \text{Abs}(B.x - C.x) - Kx - Br$$
$$DepthY = \text{Abs}(B.y - C.y) - Ky - Br$$
$$DepthZ = \text{Abs}(B.z - C.z) - Kz - Br$$

DepthX denotes the depth value in the X-axis direction. DepthY denotes the depth value in the Y-axis direction. DepthZ denotes the depth value in the Z-axis direction. B denotes the child coordinates of the skeleton point. Abs denotes calculation of the absolute value of an integer.

When DepthX<0, the skeleton point intersects the target colliding body in the X-axis direction.

Illustratively, the maximum depth value may be represented by T=max (DepthX, DepthY, DepthZ). When T<0, the skeleton point intersects the target colliding subject.

By way of example, the child coordinates of the skeleton point and the preset function are determined, and the depth values of the skeleton point in multiple dimensions are determined according to the child coordinates and the preset function. Then the depth values in multiple dimensions are compared, and the maximum of these depth values is used as the maximum depth value. When the maximum depth value is less than the preset value, it can be determined that collision information between the skeleton point and the target colliding body is the fourth collision information. In this manner, the relative position relationship between the skeleton point and the target colliding body can be determined accurately so that the collision condition between the skeleton point and the target colliding body can be determined according to the relative position relationship.

It is to be noted that when the target colliding body is a cuboid colliding body and collision information between the skeleton point and the target colliding body is the fourth collision information, the updated target display information requires to be determined according to the position information of the skeleton point, the position information of the parent skeleton point connected to the skeleton point, and the position information of the target colliding body when the target display information of the skeleton point in the to-be-processed video frame is determined according to the current collision information.

Based on the preceding embodiments, determining the target display information of the skeleton point in the to-be-processed video frame more accurately may be as below:

In response to determining that the collision information is the fourth collision information, the target display information of the skeleton point in the to-be-processed video frame is determined according to parent coordinate information of a parent skeleton point on which the skeleton point is dependent, the child coordinate information, and length information of the target colliding body in multiple dimensions.

The parent skeleton point on which the skeleton point is dependent may be a skeleton point adjacent to the skeleton point and moves through drive by the movement of the adjacent skeleton point. The parent coordinate information may be the coordinates of the parent skeleton point in a three-dimensional space. The length information of the target colliding body in multiple dimensions may be dimension information of the target colliding body, that is, the length value, width value, and height value of the target colliding body. The length information of the target colliding body in multiple dimensions may be the length value of the target colliding body in the X-axis direction, the length value of the target colliding body in the Y-axis direction, and the length value of the target colliding body in the Z-axis direction in a three-dimensional coordinate system.

Figure 8:
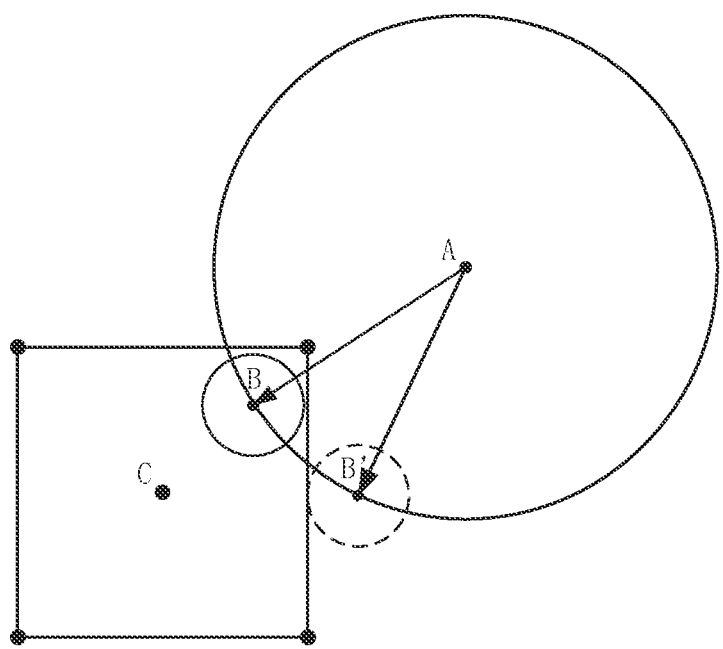
FIG. 8 is a schematic plan view of a cubic colliding subject according to an embodiment of the present disclosure.
Figure 9:
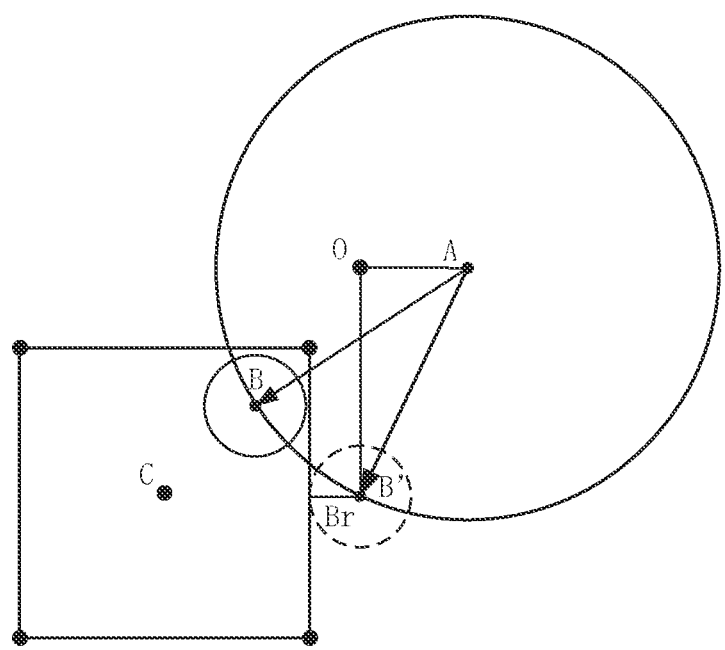
FIG. 9 is a schematic plan view of a cubic colliding subject according to an embodiment of the present disclosure.

Illustratively, as shown in FIGS. 8 and 9, the horizontal direction is the X-axis, the vertical direction is the Y-axis, and DepthX is the maximum value. Through sign=(A·x−C·x)/Abs(A·x−C·x), the plane is (Kx, 0, 0)*sign. The sign function is to take the sign of a certain number. As can be seen from the figure, sign=1. Therefore, the plane vector of this plane is (Kx, 0, 0). The right segment of the rectangle in the figure is used as the cross section of the plane.

As shown in FIG. 9, OA is perpendicular to OB', so the distance between point O and point A may be obtained by subtraction performed on the coordinate of point A in the X-axis, the coordinate of point C in the X-axis, and the radius of the colliding body to which the skeleton point belongs. Since OA is perpendicular to OB', the distance between point O and point B' may be obtained according to the Pythagorean theorem by determining the distance between point A and point B, squaring the distance between point A and point B to obtain a first to-be-processed square value, squaring the distance between point O and point A to obtain a second to-be-processed square value, performing subtraction on the first to-be-processed square value and the second to-be-processed square value, and performing extraction of square root on the subtraction result. By way of example, the coordinates of point B' can be determined according to the distance between point O and point B', that is, the target display information of the skeleton point in the to-be-processed video frame is the position of B' in the figure.

In S340, the target virtual subject is controlled to be displayed in the to-be-processed video frame according to the target display information of the at least one skeleton point.

The solution of this embodiment of the present disclosure includes dividing a target virtual subject in a to-be-processed video frame into multiple skeleton chains: determining at least one target colliding body corresponding to the target virtual subject and a corresponding colliding-body type: determining collision information between a skeleton point and a target colliding body according to at least one skeleton point and at least one spherical colliding body, and determining target display information of the at least one skeleton point in the to-be-processed video frame according to the collision information; and controlling the target virtual subject to be displayed in the to-be-processed video frame according to the target display information of the at least one skeleton point. In this manner, a poor animation display effect caused by "clipping through" or occlusion between colliding bodies is prevented during display when a skeleton point collides with a cubic colliding body. Thereby, collision information between the skeleton point and the cubic colliding body and the target display information of the skeleton point in the display interface can be determined accurately and quickly, the display position of the skeleton point in the display interface can be adjusted according to the target display information, and thus the animation display effect can be improved.

Figure 10:
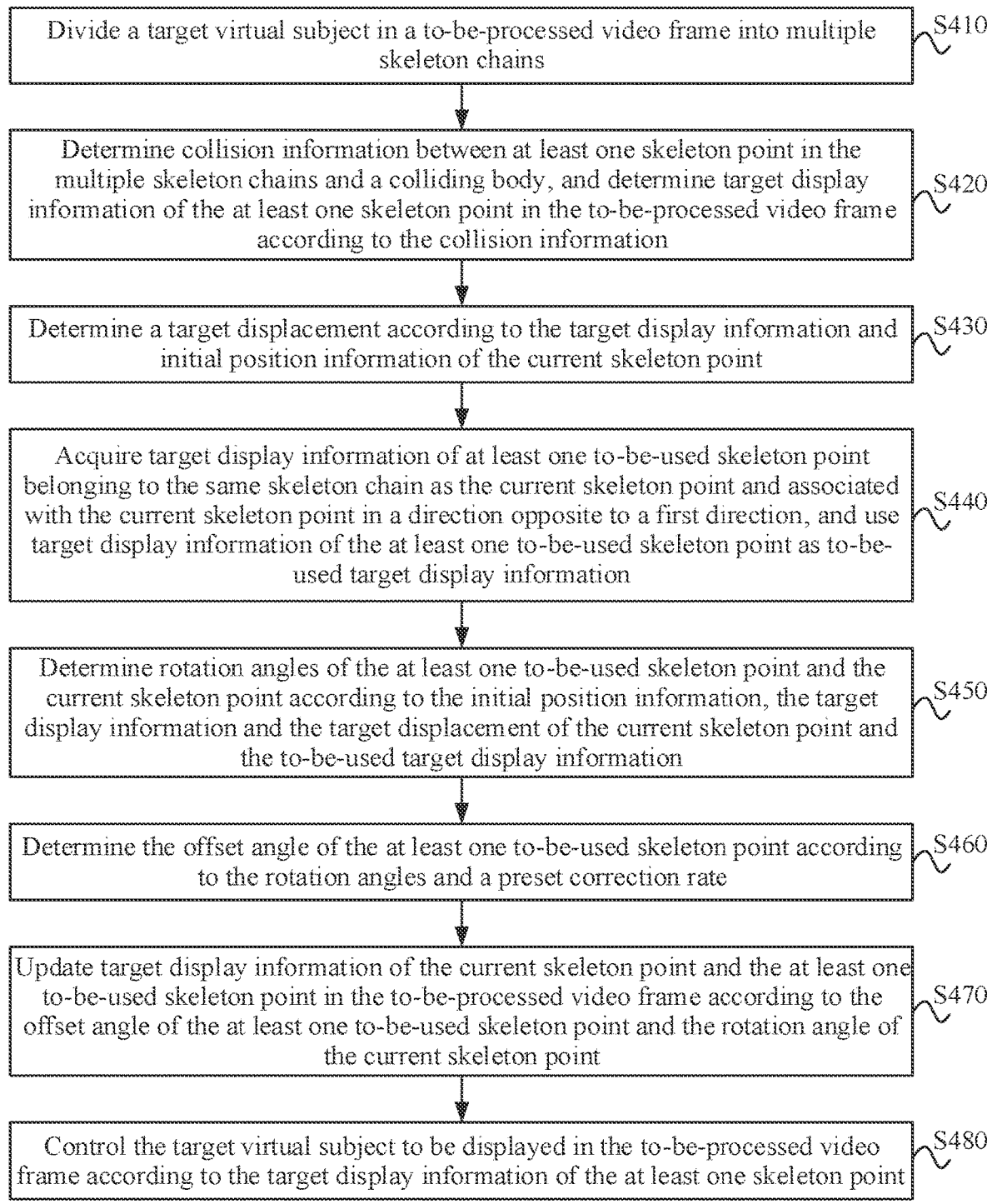
FIG. 10 is a flowchart of an image processing method according to an embodiment of the present disclosure.

FIG. 10 is a flowchart of an image processing method according to an embodiment of the present disclosure. Based on the preceding embodiments, when the target display information of a skeleton point in a display interface is determined, to achieve a smooth transition of multiple skeleton points in the same skeleton chain, the method of this embodiment may be used to determine the rotation angle of each of the skeleton points during the smooth transition. For the example implementation manner, reference may be made to the detailed description of this solution. The explanation of a term identical to or corresponding to the previous embodiment is not repeated here.

It is to be noted that when the display position of a skeleton point in a display interface is adjusted, other skeleton points belonging to the same skeleton chain as the skeleton point may not collide with a colliding body. To achieve a smooth transition of multiple skeleton points, the rotation angle of each skeleton point in the display interface may be adjusted in the manner below:

As shown in FIG. 10, the method includes the steps below:

In S410, a target virtual subject in a to-be-processed video frame is divided into multiple skeleton chains.

In S420, collision information between at least one skeleton point in the multiple skeleton chains and a colliding body is determined, and target display information of the at least one skeleton point in the to-be-processed video frame is determined according to the collision information.

In S430, a target displacement is determined according to the target display information and initial position information of the current skeleton point.

The current skeleton point may be a skeleton point that is currently colliding with a target colliding body and is located inside the target colliding body. The initial position information may be the position information of the current skeleton point inside the target colliding body. The target display information may be the adjusted target position information of the current skeleton point in the to-be-processed video frame. The target displacement may be an amount of change from the initial display position of the current skeleton point in the display interface to the target display position of the current skeleton point in the display interface.

It is to be noted that the position of the skeleton point may be adjusted through forward and backward reaching inverse kinematics (FABRIK) according to the initial position information of the skeleton point and the target display information of the skeleton point. However, ordinary FABRIK may set an angular constraint for each articular skeleton point, but the ultimate effect may result in a strong twist of partial articular skeleton points and a severe twist compared with the original motion. A particular articular skeleton point (for example, wrist) may result in a more severe anti-human skeleton twist. In view of this, it is feasible to evenly distribute a collision-caused twist to an entire skeleton chain to avoid a partial articular twist in the skeleton chain and avoid a severe twist compared with the original motion.

By way of example, when the current skeleton point is determined to be inside the target colliding body, the initial position information of the current skeleton point and the adjusted target display information of the skeleton point are determined so that the target displacement of the current skeleton point in the display interface can be determined according to the initial position information and the target display information. In this manner, the display position of the skeleton point in the display interface can be accurately moved from the initial display position to the target display position, thereby improving the smoothness of the skeleton animation motion and the animation display effect.

In S440, target display information of at least one to-be-used skeleton point belonging to the same skeleton chain as the current skeleton point and associated with the current skeleton point in a direction opposite to a first direction is acquired, and target display information of the at least one to-be-used skeleton point is used as to-be-used target display information.

A to-be-used skeleton point may be a skeleton point adjacent to the current skeleton point or may be another skeleton point in the same skeleton chain as the current skeleton point. It is to be noted that the number of to-be-used skeleton points may be 1, 2, 3, 4, or more. Illustratively, the current skeleton point is a hand articular skeleton point, so a to-be-used skeleton point may be an upper arm articular skeleton point, a lower arm articular skeleton point, or a shoulder articular skeleton point belonging to the same skeleton chain as the hand articular skeleton point. The opposite direction of the first direction may point from the current skeleton point to the to-be-used skeleton point. The target display information of the to-be-used skeleton point is the display position information of at least one to-be-used skeleton point connected to the current skeleton point when the current skeleton point is inside the target colliding body.

In practical use, the target display information of the parent skeleton point belonging to the same skeleton chain as the current skeleton point is determined, and the target display information of the parent skeleton point is used as reference information used when the current colliding point is moved from the initial position to the target display position. The reference information may be used as to-be-used target display information.

In S450, rotation angles of the at least one to-be-used skeleton point and the current skeleton point are determined according to the initial position information, the target display information, and the target displacement of the current skeleton point and the to-be-used target display information.

The rotation angle may be a small angle by which each skeleton point is rotated during a collision adjustment. Generally, after a skeleton point collides with the target colliding body, a collision adjustment is required. During the adjustment, the skeleton point and other skeleton points belonging to the same skeleton chain as the skeleton point are each rotated by a small angle to achieve similarity and smoothness of skeleton animation.

By way of example, determining rotation angles of the at least one to-be-used skeleton point and the current skeleton point according to the initial position information, the target display information, and the target displacement of the current skeleton point and the to-be-used target display information, includes, for each of at least one piece of to-be-used target display information, determining a first offset vector according to the to-be-used target display information and the initial position information; determining a second offset vector according to the initial display position of the current skeleton point and the target display information; and determining the rotation angle according to the first offset vector, the second offset vector, and the target displacement.

The first offset vector may be a vector between the display position of the to-be-used skeleton point in the display interface before adjustment and the initial display position of the current skeleton point in the display interface. It is to be noted that the direction of the first offset vector points from the to-be-used skeleton point to the current skeleton point. The number of first offset vectors is associated with the number of to-be-used skeleton points. Illustratively, when the number of to-be-used skeleton points belonging to the same skeleton chain as the current skeleton point is 3, each to-be-used skeleton point corresponds to a first offset vector.

The second offset vector may point from the initial display position of the current skeleton point to the target display position of the current skeleton point. The value of the second offset vector is the same as the target displacement.

In an example embodiment, for the to-be used target display information, the first offset vector is determined according to the initial position information of the current skeleton point and the to-be used target display information: the second offset vector is determined according to the initial display position of the current skeleton point and its corresponding target display position; the vector product of the first offset vector and the second offset vector is determined: a division is performed on the vector product and the product of the modulus length of the first offset vector and the target displacement to obtain a quotient; and scalar product of the quotient and the first offset vector is obtained, that is, the first to-be-used vector is obtained. It is to be noted that when there are multiple first offset vectors, the preceding calculation process requires to be performed for each first offset vector to obtain a respective first to-be-used vector. By way of example, multiple first to-be-used vectors are added up, and a division is performed on the addition result and the target displacement to obtain the rotation angle. This can improve the similarity and smoothness of a skeleton animation motion, thereby improving the animation display effect and verisimilitude.

Figure 11:
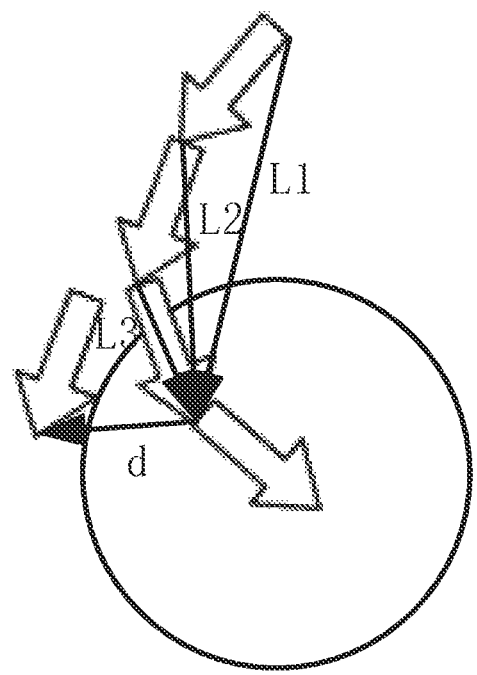
FIG. 11 is a schematic plan view illustrating a collision adjustment of a skeleton point according to an embodiment of the present disclosure.

Illustratively, as shown in FIG. 11, the number of to-be-used skeleton points is 3, and the number of corresponding first offset vectors is also 3, that is, L1, L2, L3, and d is a second offset vector, then the rotation angle may be determined using the formula below:

$$a * \left[ L1 * \frac{(L1 \times d)}{(|L1| * |d|)} + L2 * \frac{(L2 \times d)}{(|L2| * |d|)} + L3 * \frac{(L3 \times d)}{(|L3| * |d|)} \right] = |d|$$

In the formula, a denotes the rotation angle.

In S460, the offset angle of the at least one to-be-used skeleton point is determined according to the rotation angles and a preset correction rate.

The preset correction rate may be a preset adjustment basis for adjusting the to-be-used skeleton point. The preset correction rate may be any value, for example, 0.7. In practical use, when the current skeleton point is adjusted from the initial position to the target position so that the skeleton point does not collide with the target colliding body, the to-be-used skeleton point belonging to the same skeleton chain as the current skeleton point also requires to be offset correspondingly. The angle by which the to-be-used skeleton point moves in this process may be used as the offset angle of the to-be-used skeleton point.

By way of example, after the rotation angles of the current skeleton point and the at least one to-be-used skeleton point are determined, each rotation angle may be multiplied by the preset correction rate to obtain the offset angle for each to-be-used skeleton point so that each to-be-used skeleton point may be moved according to the corresponding offset angle.

It is to be noted that when the offset angle of each to-be-used skeleton point is determined so that each to-be-used skeleton point is corrected, an iteration method may be used for multiple times of correction, and the number of times of iteration may be determined according to the number of skeleton points in the skeleton chain. In the first several times of corrective adjustment, the rotation angle may be multiplied by the corresponding preset correction rate to achieve correction of each to-be-used skeleton point. In the last iteration, only the parent skeleton point is updated to ensure no penetration constraint.

It is to be noted that an iteration process may be terminated ahead of time if each skeleton point in the skeleton chain no longer collides with the target colliding subject in the iteration process.

In S470, target display information of the current skeleton point and the at least one to-be-used skeleton point in the to-be-processed video frame is updated according to the offset angle of the at least one to-be-used skeleton point and the rotation angle of the current skeleton point.

In an example embodiment, after the offset angle of each to-be-used skeleton point is determined according to the rotation angle, the display position of the current skeleton point and the at least one to-be-used skeleton point in the display interface may be adjusted according to the determined offset angle and the rotation angle of the current skeleton point so that the target display information of the current skeleton point and each to-be-used skeleton point in the to-be-processed video frame is updated so that each skeleton point no longer collides with the target colliding body. In this manner, the collision adjustment process is completed.

In S480, the target virtual subject is controlled to be displayed in the to-be-processed video frame according to the target display information of the at least one skeleton point.

It is to be noted that when skeleton points in the skeleton chain collide with the target colliding body, there may be multiple skeleton points inside the target colliding body. In this case, when the corrective adjustment is performed, a jump tends to occur when the skeleton points move out of the target colliding body.

In view of this, based on the preceding solution, the method also includes, in response to determining that the current skeleton point is the Nth consecutive skeleton point inside the target colliding body and in the skeleton chain, when determining the rotation angle of the next skeleton point of the current skeleton point, using the next skeleton point as the initial skeleton point.

N is a preset value. The initial skeleton point is a skeleton point whose rotation angle is not determined depending on the target display information of the at least one to-be-used skeleton point.

In an example embodiment, when multiple skeleton points are inside the target colliding body, if when the rotation angle of the next skeleton point of the Nth current skeleton point inside the colliding body in the skeleton chain is determined, the next skeleton point requires to be used as a skeleton point whose rotation angle is determined not depending on the target display information of the to-be-used skeleton point: then an articular twist can be avoided when the skeleton point is moving, and thus the smoothness of a skeleton motion can be improved.

Based on the preceding solution, the method also includes, in response to determining that a to-be-used skeleton point belonging to the same skeleton chain as the current skeleton point and located before the current skeleton point in the direction opposite to the first direction is not inside the target colliding body, using the current skeleton point as the initial skeleton point.

In an example embodiment, multiple current skeleton points are inside the target colliding body, and when each to-be-used skeleton point belonging to the same skeleton chain as the current skeleton point and located before the current skeleton point in the direction opposite to the first direction is under corrective adjustment, a position relationship between each to-be-adjusted to-be-used skeleton point and the current skeleton point requires to be determined. When a to-be-used skeleton point is not inside the target colliding body, the current skeleton point adjacent to the to-be-used skeleton point is used as the initial skeleton point, a rotation angle calculation is performed according to the initial skeleton point, and the offset angle of the to-be-used skeleton point is determined according to the rotation angle. In this manner, corrective adjustment of each skeleton point is achieved. Thereby, an articular twist can be avoided when the skeleton point is moving, and thus the smoothness of the skeleton motion can be improved.

In the solution of this embodiment of the present disclosure, after the current skeleton point is determined to be inside the target colliding body and the target display information corresponding to the current skeleton point is determined, the target display information of the current skeleton point in the to-be-processed video frame is updated. In this manner, a severe twist of the adjusted virtual subject motion compared with the original motion is avoided when the display position of the skeleton point in the display interface is collision-adjusted. Thereby, consistency and smoothness of the adjusted skeleton motion are assured when the display position of the skeleton point in the display interface is adjusted, and thus the animation display effect and verisimilitude are improved.

Figure 12:
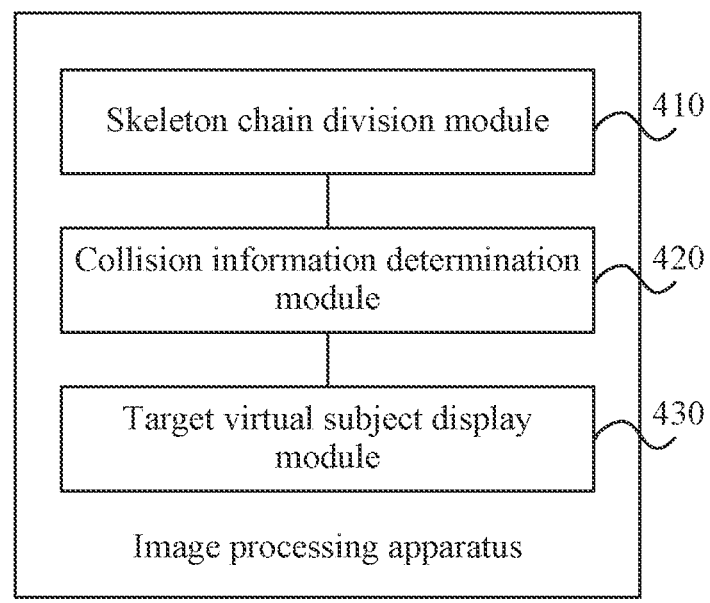
FIG. 12 is a diagram illustrating the structure of an image processing apparatus according to an embodiment of the present disclosure.

FIG. 12 is a diagram illustrating the structure of an image processing apparatus according to an embodiment of the present disclosure. As shown in FIG. 12, the apparatus includes a skeleton chain division module 510, a collision information determination module 520, and a target virtual subject display module 530.

The skeleton chain division module 510 is configured to divide a target virtual subject in a to-be-processed video frame into multiple skeleton chains, where each of the multiple skeleton chains includes at least one skeleton point.

The collision information determination module 520 is configured to determine collision information between at least one skeleton point in the multiple skeleton chains and a colliding body and determine target display information of the at least one skeleton point in the to-be-processed video frame according to the collision information.

The target virtual subject display module 530 is configured to control the target virtual subject to be displayed in the to-be-processed video frame according to the target display information of the at least one skeleton point.

Based on the preceding solutions, the skeleton chain division module 510 includes a detection part division unit and a skeleton chain determination unit.

The detection part division unit is configured to divide the target virtual subject into multiple detection parts according to a preset part division rule.

The skeleton chain determination unit is configured to determine the multiple skeleton chains corresponding to the multiple detection parts.

Based on the preceding solutions, the collision information determination module 520 includes a colliding-body type determination submodule and a collision information determination submodule.

The colliding-body type determination submodule is configured to determine at least one target colliding body corresponding to the target virtual subject and a corresponding colliding-body type.

The collision information determination submodule is configured to determine collision information between the at least one skeleton point and the at least one target colliding body according to the at least one skeleton point and the colliding-body type.

Based on the preceding solutions, the colliding-body type is a spherical colliding body, and the collision information determination submodule is also configured to, for two adjacent skeleton points in the same skeleton chain in a first direction, determine collision information between the two adjacent skeleton points and a target colliding body according to the target colliding body, a first colliding body to which a parent skeleton point belongs, and a second colliding body to which a child skeleton point belongs. The parent skeleton point is a skeleton point away from the first direction. The child skeleton point is a skeleton point pointed to by the first direction.

Based on the preceding solutions, the collision information determination submodule includes a parent skeleton point collision information determination unit and a child skeleton point collision information determination unit.

The parent skeleton point collision information determination unit is configured to, for the parent skeleton point, determine a first sphere center distance between the first colliding body and the target colliding body and determine collision information between the target colliding body and the parent skeleton point according to the first sphere center distance and a target sphere radius of the target colliding body.

The child skeleton point collision information determination unit is configured to, for the child skeleton point, determine a second sphere center distance between the second colliding body and the target colliding body and determine collision information between the child skeleton point and the target colliding body according to the second sphere center distance, the target sphere radius, and a second sphere radius of the second colliding body.

Based on the preceding solutions, the parent skeleton point collision information determination unit includes a first collision information determination subunit and a second collision information determination subunit.

The first collision information determination subunit is configured to, in response to determining that the first sphere center distance is less than the target sphere radius, determine that collision information of the parent skeleton point is first collision information, where the first collision information is that the parent skeleton point is inside the target colliding body.

The second collision information determination subunit is configured to, in response to determining that the first sphere center distance is greater than the target sphere radius, determine that collision information of the child skeleton point is second collision information, where the second collision information is that the child skeleton point is inside the target colliding body.

Based on the preceding solutions, the child skeleton point collision information determination unit includes a first sum radius determination subunit, a third collision information determination subunit, and a second collision information determination subunit.

The first sum radius determination subunit is configured to determine a first sum radius according to the target sphere radius and the second sphere radius. The third collision information determination subunit is configured to, in response to determining that the second sphere center distance is greater than the first sum radius, determine that the collision information is third collision information, where the third collision information is that the child skeleton point is not in collision with the target colliding body. The second collision information determination subunit is configured to, in response to determining that the second sphere center distance is less than the first sum radius, determine that the collision information is second collision information, where the second collision information is that the child skeleton point is inside the target colliding body.

Based on the preceding solutions, the collision information determination module 520 includes a target display position adjustment submodule. The target display position adjustment submodule is configured to, in response to determining that the collision information is the first collision information, adjust the target display position of the parent skeleton point in the to-be-processed video frame according to target sphere center coordinates of the target colliding body, first sphere center coordinates of the first colliding body, second sphere center coordinates of the second colliding body, and a first sum radius.

The parent skeleton point corresponds to the first sphere center coordinates. The child skeleton point corresponds to the second sphere center coordinates. The target display information contains the target display position.

Based on the preceding solutions, the collision information determination module 520 includes a target display information determination submodule. The target display information determination submodule is configured to, in response to determining that the collision information is the second collision information, determine target display information of the child skeleton point in the to-be-processed video frame according to a first sum radius, the first sphere center distance, first sphere center coordinates of the parent skeleton point, and second sphere center coordinates of the child skeleton point.

Based on the preceding solutions, the target display information determination submodule includes a first transition value determination unit, a first unit vector determination unit, a second transition value determination unit, and a target display information determination unit.

The first transition value determination unit is configured to determine a first transition value according to the first sphere center distance, the first sum radius, and a third sphere center distance between the first sphere center coordinates and the second sphere center coordinates.

The first unit vector determination unit is configured to determine a first unit vector according to the first sphere center coordinates and target sphere center coordinates.

The second transition value determination unit is configured to determine a second transition value according to the first transition value, the first sphere center coordinates, and the first unit vector.

The target display information determination unit is configured to determine the target display information according to the second transition value, the first unit vector, and the second sphere center coordinates.

Based on the preceding solutions, the target display information determination unit includes a third transition value determination subunit, a fourth transition value determination subunit, and a target display information determination subunit.

The third transition value determination subunit is configured to determine a third transition value according to the first sphere center distance, the third sphere center distance, and the first sum radius.

The fourth transition value determination subunit is configured to determine a fourth transition value according to the third transition value, the second sphere center coordinates, the first unit vector, and a second unit vector obtained from the second transition value and the second sphere center coordinates.

The target display information determination subunit is configured to determine the target display information of the child skeleton point according to the fourth transition value, the second transition value, and the third transition value.

Based on the preceding solutions, the colliding-body type is a cubic colliding body, and the collision information determination submodule is also configured to, for a skeleton point in the same skeleton chain in a first direction, determine collision information between the skeleton point and a target colliding body according to child coordinates of the skeleton point and a preset function.

Based on the preceding solutions, the collision information determination submodule includes a depth value determination unit and a fourth collision information determination unit.

The depth value determination unit is configured to determine depth values of the skeleton point in multiple dimensions according to the child coordinates and the preset function.

The fourth collision information determination unit is configured to, in response to determining that the maximum depth value of the depth values is less than a preset value, determine that collision information between the skeleton point and the target colliding body is fourth collision information.

Based on the preceding solutions, the collision information determination module 520 is also configured to, in response to determining that the collision information is the fourth collision information, determine the target display information of the at least one skeleton point in the to-be-processed video frame according to parent coordinate information of a parent skeleton point on which the skeleton point is dependent, the child coordinate information, and length information of the target colliding body in multiple dimensions.

Based on the preceding solutions, after the current skeleton point is inside a target colliding body and after target display information corresponding to the current skeleton point is determined, the apparatus also includes a target displacement determination module, a to-be-used target display information determination module, a rotation angle determination module, an offset angle determination module, and a target display information update module.

The target displacement determination module is configured to determine a target displacement according to the target display information and initial position information of the current skeleton point.

The to-be-used target display information determination module is configured to acquire target display information of at least one to-be-used skeleton point belonging to the same skeleton chain as the current skeleton point and associated with the current skeleton point in a direction opposite to a first direction and use target display information of the at least one to-be-used skeleton point as to-be-used target display information.

The rotation angle determination module is configured to determine rotation angles of the at least one to-be-used skeleton point and the current skeleton point according to the to-be-used target display information, the target displacement, and the target display information of the current skeleton point.

The offset angle determination module is configured to determine an offset angle of the at least one to-be-used skeleton point according to the rotation angles and a preset correction rate.

The target display information update module is configured to update target display information of the current skeleton point and the at least one to-be-used skeleton point in the to-be-processed video frame according to the offset angle of the at least one to-be-used skeleton point and the rotation angle of the current skeleton point.

Based on the preceding solutions, the apparatus also includes a first initial skeleton point determination module.

The first initial skeleton point determination module is configured to, in response to determining that the current skeleton point is the Nth consecutive skeleton point inside the target colliding body and in the skeleton chain, when determining the rotation angle of the next skeleton point of the current skeleton point, use the next skeleton point as the initial skeleton point.

N is a preset value. The initial skeleton point is a skeleton point whose rotation angle is not determined depending on the target display information of the at least one to-be-used skeleton point.

Based on the preceding solutions, the apparatus also includes a second initial skeleton point determination module.

The second initial skeleton point determination module is configured to, in response to determining that a to-be-used skeleton point belonging to the same skeleton chain as the current skeleton point and located before the current skeleton point in the direction opposite to the first direction is not inside the target colliding body, use the current skeleton point as the initial skeleton point.

The solution of this embodiment of the present disclosure includes dividing a target virtual subject in a to-be-processed video frame into multiple skeleton chains: determining collision information between the at least one skeleton point in the multiple skeleton chains and a colliding body and determining target display information of the at least one skeleton point in the to-be-processed video frame according to the collision information; and controlling the target virtual subject to be displayed in the to-be-processed video frame according to the target display information of the at least one skeleton point. In this manner, a skeleton point of the target virtual subject is prevented from colliding with a colliding subject. Thereby, mutual penetration and superimposition between the skeleton point and the colliding subject is prevented, and thus a poor animation display effect is prevented. Moreover, the display position of the skeleton point of the target virtual subject in the display interface is automatically adjusted when "clipping through" is detected in the display interface: thereby, the verisimilitude of display screen is improved, the animation display effect is improved, and the user experience is improved.

The image processing apparatus of this embodiment of the present disclosure can perform the image processing method of any embodiment of the present disclosure and has function modules and beneficial effects corresponding to the performed method.

Units and modules included in the preceding apparatus are divided according to function logic. These units and modules may also be divided in other manners as long as the corresponding functions can be implemented. Moreover, names of these function units are used for distinguishing between these function units and not intended to limit the scope of this embodiment of the present disclosure.

Figure 13:
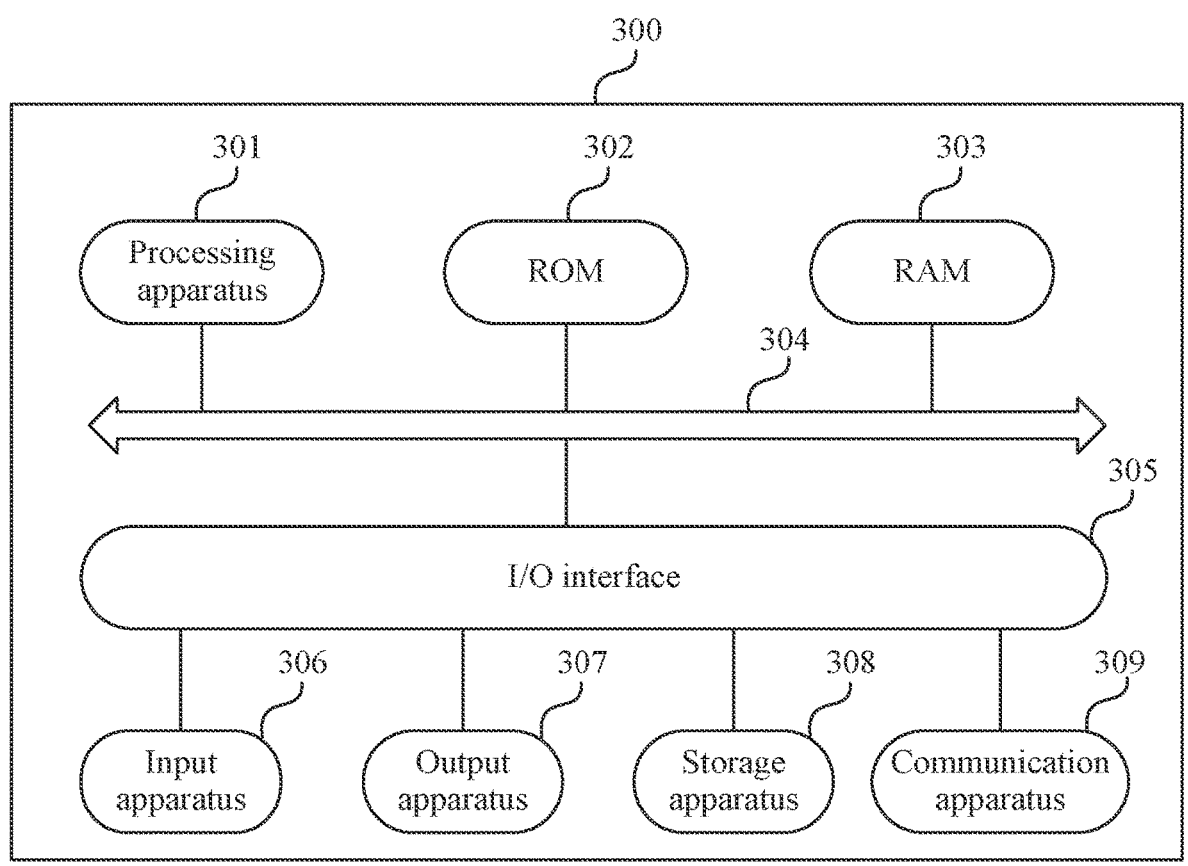
FIG. 13 is a diagram illustrating the structure of an electronic device according to an embodiment of the present disclosure.

FIG. 13 is a diagram illustrating the structure of an electronic device according to an embodiment of the present disclosure. FIG. 13 is a diagram illustrating the structure of an electronic device (for example, a terminal device or server in FIG. 13) 300 for implementing embodiments of the present disclosure. A terminal device in the embodiments of the present disclosure may include, but is not limited to, mobile terminals such as a mobile phone, a laptop, a digital broadcast receiver, a personal digital assistant (PDA), a PAD, a portable media player (PMP), and an in-vehicle terminal (such as an in-vehicle navigation terminal) and stationary terminals such as a digital television (TV) and a desktop computer. The electronic device shown in FIG. 13 is merely an example and is not intended to limit the function and usage scope of the embodiments of the present disclosure.

As shown in FIG. 13, the electronic device 300 may include a processing apparatus (such as a central processing unit and a graphics processing unit) 301. The processing apparatus 301 may perform various types of appropriate operations and processing based on a program stored in a read-only memory (ROM) 302 or a program loaded from a storage apparatus 308 to a random-access memory (RAM) 303. The RAM 303 also stores various programs and data required for the operation of the electronic device 300. The processing apparatus 301, the ROM 302 and the RAM 303 are connected to each other through a bus 304. An input/output (I/O) interface 305 is also connected to the bus 304.

Generally, the following apparatuses may be connected to the I/O interface 305: an input apparatus 306 such as a touch screen, a touch pad, a keyboard, a mouse, a camera, a microphone, an accelerometer and a gyroscope: an output apparatus 307 such as a liquid crystal display (LCD), a speaker and a vibrator: the storage apparatus 308 such as a magnetic tape and a hard disk; and a communication apparatus 309. The communication apparatus 309 may allow the electronic device 300 to perform wireless or wired communication with other devices so as to exchange data. Although FIG. 13 shows the electronic device 300 having various apparatuses, it is to be understood that not all the apparatuses shown herein need to be implemented or present. Alternatively, more or fewer apparatuses may be implemented or present.

According to embodiments of the present disclosure, the process described above with reference to the flowchart may be implemented as a computer software program. For example, the embodiments of the present disclosure include a computer program product. The computer program product includes a computer program carried in a non-transitory computer-readable medium. The computer program includes program codes for executing the method shown in the flowchart. In such an embodiment, the computer program may be downloaded from a network and installed through the communication apparatus 309, or may be installed from the storage apparatus 308, or may be installed from the ROM 302. When the computer program is executed by the processing apparatus 301, the preceding functions defined in the method of the embodiments of the present disclosure are executed.

Names of messages or information exchanged between apparatuses in embodiments of the present disclosure are illustrative and not to limit the scope of the messages or information.

The electronic device of this embodiment of the present disclosure belongs to the same concept as the image processing methods provided in the preceding embodiments, and for the technical details not described in detail in the embodiment, reference may be made to the preceding embodiments, and the embodiment has the same beneficial effects as the preceding embodiments.

An embodiment of the present disclosure provides a computer storage medium storing a computer program which, when executed by a processor, implements the image processing method provided in the preceding embodiments.

It is to be noted that the preceding computer-readable medium in the present disclosure may be a computer-readable signal medium or a computer-readable storage medium or any combination thereof. The computer-readable storage medium, for example, may be, but is not limited to, an electronic, magnetic, optical, electromagnetic, infrared or semiconductor system, apparatus or device or any combination thereof. More specific examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM), a flash memory, an optical fiber, a portable compact disk read-only memory (CD-ROM), an optical memory device, a magnetic memory device, or any appropriate combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. The data signal propagated in this manner may be in multiple forms and includes, and is not limited to, an electromagnetic signal, an optical signal, or any suitable combination thereof. The computer-readable signal medium may further be any computer-readable medium other than the computer-readable storage medium. The computer-readable signal medium may send, propagate, or transmit a program used by or in conjunction with an instruction execution system, apparatus, or device. The program codes included on the computer-readable medium may be transmitted via any appropriate medium which includes, but is not limited to, a wire, an optical cable, a radio frequency (RF), or any appropriate combination thereof.

In some embodiments, clients and servers may communicate using any currently known or future developed network protocol, such as HTTP (HyperText Transfer Protocol), and may be interconnected with any form or medium of digital data communication (such as a communication network). Examples of the communication network include a local area network (LAN), a wide area network (WAN), an internet (such as the Internet), and a peer-to-peer network (such as an Ad-Hoc network), as well as any currently known or future developed network.

The computer-readable medium may be included in the electronic device or may exist alone without being assembled into the electronic device.

The computer-readable medium carries one or more programs which, when executed by the electronic device, cause the electronic device to perform the following steps: dividing a target virtual subject in a to-be-processed video frame into multiple skeleton chains, where each of the multiple skeleton chains includes at least one skeleton point: determining collision information between at least one skeleton point in the multiple skeleton chains and a colliding body and determining target display information of the at least one skeleton point in the to-be-processed video frame according to the collision information; and controlling the target virtual subject to be displayed in the to-be-processed video frame according to the target display information of the at least one skeleton point.

Computer program codes for performing the operations in the present disclosure may be written in one or more programming languages or combination thereof. The preceding one or more programming languages include, but are not limited to, subject-oriented programming languages such as Java, Smalltalk and C++, as well as conventional procedural programming languages such as C or similar programming languages. Program codes may be executed entirely on a user computer, partly on a user computer, as a stand-alone software package, partly on a user computer and partly on a remote computer, or entirely on a remote computer or a server. In the case relate to the remote computer, the remote computer may be connected to the user computer via any kind of network including a local area network (LAN) or a wide area network (WAN), or may be connected to an external computer (for example, via the Internet through an Internet service provider).

The flowcharts and block diagrams in the drawings show possible architectures, functions and operations of the system, method and computer program product according to multiple embodiments of the present disclosure. In this regard, each block in the flowcharts or block diagrams may represent a module, a program segment, or part of codes that contains one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system which executes specified functions or operations, or a combination of special-purpose hardware and computer instructions.

The units involved in the embodiments of the present disclosure may be implemented by software or hardware. The name of a unit is not intended to limit the unit in a certain circumstance. For example, the first acquisition unit may also be described as a "unit for acquiring at least two Internet Protocol addresses".

The functions described above herein may be executed, at least partially, by one or more hardware logic components. For example, and without limitations, example types of hardware logic components that may be used include: a field-programmable gate array (FPGA), an application-specific integrated circuit (ASIC), an application-specific standard product (ASSP), system on a chip (SOC), a complex programmable logic device (CPLD) and the like.

In the context of the present disclosure, the machine-readable medium may be a tangible medium that may include or store a program that is used by or used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any suitable combination thereof.

According to one or more embodiments of the present disclosure, [example one] provides an image processing method. The method includes dividing a target virtual subject in a to-be-processed video frame into multiple skeleton chains, where each of the multiple skeleton chains includes at least one skeleton point: determining collision information between at least one skeleton point in the multiple skeleton chains and a colliding body and determining target display information of the at least one skeleton point in the to-be-processed video frame according to the collision information; and controlling the target virtual subject to be displayed in the to-be-processed video frame according to the target display information of the at least one skeleton point.

According to one or more embodiments of the present disclosure, [example two] provides an image processing method. The method also includes dividing the target virtual subject into multiple detection parts according to a preset part division rule; and determining the multiple skeleton chains corresponding to the multiple detection parts.

According to one or more embodiments of the present disclosure, [example three] provides an image processing method. The method also includes determining at least one target colliding body corresponding to the target virtual subject and a corresponding colliding-body type; and determining collision information between the at least one skeleton point and the at least one target colliding body according to the at least one skeleton point and the colliding-body type.

According to one or more embodiments of the present disclosure, [example four] provides an image processing method. The method also includes, for two adjacent skeleton points in the same skeleton chain in a first direction, determining collision information between the two adjacent skeleton points and a target colliding body according to the target colliding body, a first colliding body to which a parent skeleton point belongs, and a second colliding body to which a child skeleton point belongs.

The parent skeleton point is a skeleton point away from the first direction. The child skeleton point is a skeleton point pointed to by the first direction.

According to one or more embodiments of the present disclosure, [example five] provides an image processing method. The method also includes, for the parent skeleton point, determining a first sphere center distance between the first colliding body and the target colliding body and determining collision information between the target colliding body and at least one of the parent skeleton point or the child skeleton point according to the first sphere center distance and a target sphere radius of the target colliding body; and for the child skeleton point, determining a second sphere center distance between the second colliding body and the target colliding body and determining collision information between the child skeleton point and the target colliding body according to the second sphere center distance, the target sphere radius, and a second sphere radius of the second colliding body.

According to one or more embodiments of the present disclosure, [example six] provides an image processing method. The method also includes, in response to determining that the first sphere center distance is less than the target sphere radius, determining that collision information of the parent skeleton point is first collision information, where the first collision information is that the parent skeleton point is inside the target colliding body; and in response to determining that the first sphere center distance is greater than the target sphere radius, determining that collision information of the child skeleton point is second collision information, where the second collision information is that the child skeleton point is inside the target colliding body:

According to one or more embodiments of the present disclosure, [example seven] provides an image processing method. The method also includes determining a first sum radius according to the target sphere radius and the second sphere radius: in response to determining that the second sphere center distance is greater than the first sum radius, determining that the collision information is third collision information, wherein the third collision information is that the child skeleton point is not in collision with the target colliding body; and in response to determining that the second sphere center distance is less than the first sum radius, determining that the collision information is second collision information, wherein the second collision information is that the child skeleton point is inside the target colliding body.

According to one or more embodiments of the present disclosure, [example eight] provides an image processing method. The method also includes in response to determining that the collision information is the first collision information, adjusting the target display position of the parent skeleton point in the to-be-processed video frame according to target sphere center coordinates of the target colliding body; first sphere center coordinates of the first colliding body, second sphere center coordinates of the second colliding body, and a first sum radius.

The parent skeleton point corresponds to the first sphere center coordinates. The child skeleton point corresponds to the second sphere center coordinates. The target display information contains the target display position.

According to one or more embodiments of the present disclosure, [example nine] provides an image processing method. The method also includes, in response to determining that the collision information is the second collision information, determining target display information of the child skeleton point in the to-be-processed video frame according to a first sum radius, the first sphere center distance, first sphere center coordinates of the parent skeleton point, and second sphere center coordinates of the child skeleton point.

According to one or more embodiments of the present disclosure, [example ten] provides an image processing method. The method also includes determining a first transition value according to the first sphere center distance, the first sum radius, and a third sphere center distance between the first sphere center coordinates and the second sphere center coordinates; determining a first unit vector according to the first sphere center coordinates and target sphere center coordinates: determining a second transition value according to the first transition value, the first sphere center coordinates, and the first unit vector; and determining the target display information according to the second transition value, the first unit vector, and the second sphere center coordinates.

According to one or more embodiments of the present disclosure, [example eleven] provides an image processing method. The method also includes
determining a third transition value according to the first sphere center distance, the third sphere center distance, and the first sum radius: determining a fourth transition value according to the third transition value, the second sphere center coordinates, the first unit vector, and a second unit vector obtained from the second transition value and the second sphere center coordinates; and determining the target display information of the child skeleton point according to the fourth transition value, the second transition value, and the third transition value.

According to one or more embodiments of the present disclosure, [example twelve] provides an image processing method. The method also includes, for a skeleton point in the same skeleton chain in a first direction, determining collision information between the skeleton point and a target colliding body according to child coordinates of the skeleton point and a preset function.

According to one or more embodiments of the present disclosure, [example thirteen] provides an image processing method. The method also includes determining depth values of the skeleton point in multiple dimensions according to the child coordinates and the preset function; and in response to determining that the maximum depth value of the depth values is less than a preset value, determining that collision information between the skeleton point and the target colliding body is fourth collision information.

According to one or more embodiments of the present disclosure, [example fourteen] provides an image processing method. The method also includes, in response to determining that the collision information is the fourth collision information, determining the target display information of the at least one skeleton point in the to-be-processed video frame according to parent coordinate information of a parent skeleton point on which the skeleton point is dependent, the child coordinate information, and length information of the target colliding body in multiple dimensions.

According to one or more embodiments of the present disclosure, [example fifteen] provides an image processing method. The method also includes rendering the target virtual subject in the to-be-processed video frame according to the adjusted target display position of the at least one skeleton point.

According to one or more embodiments of the present disclosure, [example sixteen] provides an image processing method. The method also includes determining a target displacement according to the target display information and initial position information of the current skeleton point: acquiring target display information of at least one to-be-used skeleton point belonging to the same skeleton chain as the current skeleton point and associated with the current skeleton point in a direction opposite to a first direction and using target display information of the at least one to-be-used skeleton point as to-be-used target display information; determining rotation angles of the at least one to-be-used skeleton point and the current skeleton point according to the initial position information, the target display information and the target displacement of the current skeleton point and the to-be-used target display information; determining an offset angle of the at least one to-be-used skeleton point according to the rotation angles and a preset correction rate; and updating target display information of the current skeleton point and the at least one to-be-used skeleton point in the to-be-processed video frame according to the offset angle of the at least one to-be-used skeleton point and the rotation angle of the current skeleton point.

According to one or more embodiments of the present disclosure, [example seventeen] provides an image processing method. The method also includes, for each of at least one piece of to-be-used target display information, determining a first offset vector according to the to-be-used target display information and the initial position information: determining a second offset vector according to the initial display position of the current skeleton point and the target display information; and determining the rotation angle according to at least one first offset vector, the second offset vector, and the target displacement.

According to one or more embodiments of the present disclosure, [example eighteen] provides an image processing method. The method also includes, in response to determining that the current skeleton point is the Nth consecutive skeleton point inside the target colliding body and in the skeleton chain, when determining the rotation angle of the next skeleton point of the current skeleton point, using the next skeleton point as the initial skeleton point.

N is a preset value. The initial skeleton point is a skeleton point whose rotation angle is not determined depending on the target display information of the at least one to-be-used skeleton point.

According to one or more embodiments of the present disclosure, [example nineteen] provides an image processing method. The method also includes in response to determining that a to-be-used skeleton point belonging to the same skeleton chain as the current skeleton point and located before the current skeleton point in the direction opposite to the first direction is not inside the target colliding body, using the current skeleton point as the initial skeleton point.

According to one or more embodiments of the present disclosure, [example twenty] provides an image processing apparatus. The apparatus includes a skeleton chain division module, a collision information determination module, and a target virtual subject display module.

The skeleton chain division module is configured to divide a target virtual subject in a to-be-processed video frame into a plurality of skeleton chains, where each of the plurality of skeleton chains includes at least one skeleton point.

The collision information determination module is configured to determine collision information between the at least one skeleton point in the plurality of skeleton chains and a colliding body and determine target display information of the at least one skeleton point in the to-be-processed video frame according to the collision information.

The target virtual subject display module is configured to control the target virtual subject to be displayed in the to-be-processed video frame according to the target display information of the at least one skeleton point.

In addition, although the operations are depicted in a particular order, this should not be construed as requiring that such operations should be performed in the particular order shown or in a sequential order. In certain circumstances, multitasking and parallel processing may be advantageous. Similarly, although specific implementation details are included in the above discussion, these should not be construed as limiting the scope of the present disclosure. Some features described in the context of separate embodiments may also be implemented in combination in a single embodiment. Conversely, various features described in the context of a single embodiment may also be implemented in multiple embodiments, individually or in any suitable subcombination.

What is claimed is:

1. An image processing method, comprising:
    dividing a skeleton model of a target virtual subject in a to-be-processed video frame into a plurality of skeleton chains, wherein each of the plurality of skeleton chains comprises at least one skeleton point;
    determining collision information between at least one skeleton point in the plurality of skeleton chains and a colliding body and determining target display information of the at least one skeleton point in the to-be-processed video frame according to the collision information; and
    controlling the target virtual subject to be displayed in the to-be-processed video frame according to the target display information of the at least one skeleton point;
    wherein dividing the target virtual subject in the to-be-processed video frame into the plurality of skeleton chains comprises:
    dividing the target virtual subject into a plurality of detection parts according to a preset part division rule; and
    determining the plurality of skeleton chains of the skeleton model corresponding to the plurality of detection parts; and
    wherein controlling the target virtual subject to be displayed in the to-be-processed video frame according to the target display information of the at least one skeleton point comprises:
    rendering the target virtual subject in the to-be-processed video frame according to an adjusted target display position of the at least one skeleton point.

2. The method of claim 1, wherein determining the collision information between the at least one skeleton point in the plurality of skeleton chains and the colliding body comprises:
    determining at least one target colliding body corresponding to the target virtual subject and a corresponding colliding-body type; and
    determining collision information between the at least one skeleton point and the at least one target colliding body according to the at least one skeleton point and the colliding-body type.

3. The method of claim 2, wherein the colliding-body type is a spherical colliding body, and determining the collision information between the at least one skeleton point and the at least one target colliding body according to the at least one skeleton point and the colliding-body type comprises:
    for two adjacent skeleton points in a same skeleton chain of the plurality of skeleton chains in a first direction, determining collision information between the two adjacent skeleton points and a target colliding body of the at least one target colliding body according to the target colliding body, a first colliding body to which a parent skeleton point belongs, and a second colliding body to which a child skeleton point belongs, wherein the parent skeleton point is a skeleton point away from the first direction, and the child skeleton point is a skeleton point pointed to by the first direction.

4. The method of claim 3, wherein determining the collision information between the two adjacent skeleton points and the target colliding body according to the target colliding body, the first colliding body to which the parent skeleton point belongs, and the second colliding body to which the child skeleton point belongs comprises:
    for the parent skeleton point, determining a first sphere center distance between the first colliding body and the target colliding body and determining collision information between the target colliding body and at least one of the parent skeleton point or the child skeleton point according to the first sphere center distance and a target sphere radius of the target colliding body; and for the child skeleton point, determining a second sphere center distance between the second colliding body and the target colliding body and determining collision information between the child skeleton point and the target colliding body according to the second sphere center distance, the target sphere radius, and a second sphere radius of the second colliding body.

5. The method of claim 4, wherein determining collision information between the parent skeleton point and the target colliding body according to the first sphere center distance and the target sphere radius of the target colliding body comprises:
in response to determining that the first sphere center distance is less than the target sphere radius, determining that collision information of the parent skeleton point is first collision information, wherein the first collision information is that the parent skeleton point is inside the target colliding body; and
in response to determining that the first sphere center distance is greater than the target sphere radius, determining that collision information of the child skeleton point is second collision information, wherein the second collision information is that the child skeleton point is inside the target colliding body.

6. The method of claim 5, wherein determining the target display information of the at least one skeleton point in the to-be-processed video frame according to the collision information comprises:
in response to determining that the collision information is the first collision information, adjusting a target display position of the parent skeleton point in the to-be-processed video frame according to target sphere center coordinates of the target colliding body, first sphere center coordinates of the first colliding body, second sphere center coordinates of the second colliding body, and a first sum radius, wherein
the parent skeleton point corresponds to the first sphere center coordinates, the child skeleton point corresponds to the second sphere center coordinates, and the target display information contains the target display position.

7. The method of claim 5, wherein determining the target display information of the at least one skeleton point in the to-be-processed video frame according to the collision information comprises:
in response to determining that the collision information is the second collision information, determining target display information of the child skeleton point in the to-be-processed video frame according to a first sum radius, the first sphere center distance, first sphere center coordinates of the parent skeleton point, and second sphere center coordinates of the child skeleton point.

8. The method of claim 7, wherein determining the target display information of the child skeleton point in the to-be-processed video frame according to the first sum radius, the first sphere center distance, the first sphere center coordinates of the parent skeleton point, and the second sphere center coordinates of the child skeleton point comprises:
determining a first transition value according to the first sphere center distance, the first sum radius, and a third sphere center distance between the first sphere center coordinates and the second sphere center coordinates;
determining a first unit vector according to the first sphere center coordinates and target sphere center coordinates;
determining a second transition value according to the first transition value, the first sphere center coordinates, and the first unit vector; and
determining the target display information according to the second transition value, the first unit vector, and the second sphere center coordinates.

9. The method of claim 8, wherein determining the target display information according to the second transition value, the first unit vector, and the second sphere center coordinates comprises:
determining a third transition value according to the first sphere center distance, the third sphere center distance, and the first sum radius;
determining a fourth transition value according to the third transition value, the second sphere center coordinates, the first unit vector, and a second unit vector obtained from the second transition value and the second sphere center coordinates; and
determining the target display information of the child skeleton point according to the fourth transition value, the second transition value, and the third transition value.

10. The method of claim 4, wherein determining the collision information between the child skeleton point and the target colliding body according to the second sphere center distance, the target sphere radius, and the second sphere radius of the second colliding body comprises:
determining a first sum radius according to the target sphere radius and the second sphere radius;
in response to determining that the second sphere center distance is greater than the first sum radius, determining that the collision information is third collision information, wherein the third collision information is that the child skeleton point is not in collision with the target colliding body; and
in response to determining that the second sphere center distance is less than the first sum radius, determining that the collision information is second collision information, wherein the second collision information is that the child skeleton point is inside the target colliding body.

11. The method of claim 10, wherein determining the target display information of the at least one skeleton point in the to-be-processed video frame according to the collision information comprises:
in response to determining that the collision information is the second collision information, determining target display information of the child skeleton point in the to-be-processed video frame according to a first sum radius, the first sphere center distance, first sphere center coordinates of the parent skeleton point, and second sphere center coordinates of the child skeleton point.

12. The method of claim 2, wherein the colliding-body type is a cubic colliding body, and determining the collision information between the at least one skeleton point and the at least one target colliding body according to the at least one skeleton point and the colliding-body type comprises:
for a skeleton point in a same skeleton chain of the plurality of skeleton chains in a first direction, determining collision information between the skeleton point in the first direction and a target colliding body of the at least one target colliding body according to child coordinates of the skeleton point and a preset function.

13. The method of claim 12, wherein determining the collision information between the skeleton point in the first direction and the target colliding body according to the child coordinates of the skeleton point and the preset function comprises:

determining depth values of the skeleton point in a plurality of dimensions according to the child coordinates and the preset function; and in response to determining that a maximum depth value of the depth values is less than a preset value, determining that the collision information between the skeleton point in the first direction and the target colliding body is fourth collision information.

14. The method of claim 13, wherein determining the target display information of the at least one skeleton point in the to-be-processed video frame according to the collision information comprises:

in response to determining that the collision information is the fourth collision information, determining the target display information of the at least one skeleton point in the to-be-processed video frame according to parent coordinate information of a parent skeleton point on which the skeleton point is dependent, the child coordinates, and length information of the target colliding body in a plurality of dimensions.

15. The method of claim 1, wherein after a current skeleton point is inside a target colliding body and after determining target display information corresponding to the current skeleton point, the method further comprises:

determining a target displacement according to the target display information and initial position information of the current skeleton point;

acquiring target display information of at least one to-be-used skeleton point belonging to a same skeleton chain as the current skeleton point and associated with the current skeleton point in a direction opposite to a first direction and using target display information of the at least one to-be-used skeleton point as to-be-used target display information;

determining rotation angles of the at least one to-be-used skeleton point and the current skeleton point according to the initial position information, the target display information and the target displacement of the current skeleton point and the to-be-used target display information;

determining an offset angle of the at least one to-be-used skeleton point according to the rotation angles and a preset correction rate; and updating target display information of the current skeleton point and the at least one to-be-used skeleton point in the to-be-processed video frame according to the offset angle of the at least one to-be-used skeleton point and a rotation angle of the current skeleton point.

16. The method of claim 15, further comprising:

in response to determining that the current skeleton point is an Nth consecutive skeleton point inside the target colliding body and in the skeleton chain, when determining a rotation angle of a next skeleton point of the current skeleton point, using the next skeleton point as an initial skeleton point, wherein N is a preset value, and the initial skeleton point is a skeleton point whose rotation angle is not determined depending on the target display information of the at least one to-be-used skeleton point.

17. The method of claim 15, further comprising:

in response to determining that a to-be-used skeleton point belonging to the same skeleton chain as the current skeleton point and located before the current skeleton point in the direction opposite to the first direction is not inside the target colliding body, using the current skeleton point as an initial skeleton point.

18. An electronic device, comprising:

one or more processors, and a storage apparatus configured to store one or more programs, wherein the one or more processors are configured to perform steps:

dividing a skeleton model of a target virtual subject in a to-be-processed video frame into a plurality of skeleton chains, wherein each of the plurality of skeleton chains comprises at least one skeleton point;

determining collision information between at least one skeleton point in the plurality of skeleton chains and a colliding body and determining target display information of the at least one skeleton point in the to-be-processed video frame according to the collision information; and controlling the target virtual subject to be displayed in the to-be-processed video frame according to the target display information of the at least one skeleton point;

wherein dividing the target virtual subject in the to-be-processed video frame into the plurality of skeleton chains comprises:

dividing the target virtual subject into a plurality of detection parts according to a preset part division rule; and determining the plurality of skeleton chains of the skeleton model corresponding to the plurality of detection parts; and wherein controlling the target virtual subject to be displayed in the to-be-processed video frame according to the target display information of the at least one skeleton point comprises:

rendering the target virtual subject in the to-be-processed video frame according to an adjusted target display position of the at least one skeleton point.

19. A non-transitory storage medium containing computer-executable instructions, which when executed by a computer processor, cause the processor to perform steps:

dividing a skeleton model of a target virtual subject in a to-be-processed video frame into a plurality of skeleton chains, wherein each of the plurality of skeleton chains comprises at least one skeleton point;

determining collision information between at least one skeleton point in the plurality of skeleton chains and a colliding body and determining target display information of the at least one skeleton point in the to-be-processed video frame according to the collision information; and controlling the target virtual subject to be displayed in the to-be-processed video frame according to the target display information of the at least one skeleton point;

wherein dividing the target virtual subject in the to-be-processed video frame into the plurality of skeleton chains comprises:

dividing the target virtual subject into a plurality of detection parts according to a preset part division rule; and determining the plurality of skeleton chains of the skeleton model corresponding to the plurality of detection parts; and wherein controlling the target virtual subject to be displayed in the to-be-processed video frame according to the target display information of the at least one skeleton point comprises:

rendering the target virtual subject in the to-be-processed video frame according to an adjusted target display position of the at least one skeleton point.

* * * * *